US010841257B1

(12) United States Patent
Bragdon

(10) Patent No.: US 10,841,257 B1
(45) Date of Patent: Nov. 17, 2020

(54) DETERMINING ENGAGEMENT SCORES FOR SUB-CATEGORIES IN A DIGITAL DOMAIN BY A COMPUTING SYSTEM

(71) Applicant: Twitter, Inc., San Francisco, CA (US)

(72) Inventor: Andrew Bragdon, Brentwood, CA (US)

(73) Assignee: Twitter, Inc., San Francisco, CA (US)

(*) Notice: Subject to any disclaimer, the term of this patent is extended or adjusted under 35 U.S.C. 154(b) by 220 days.

(21) Appl. No.: 15/793,793

(22) Filed: Oct. 25, 2017

Related U.S. Application Data

(60) Provisional application No. 62/412,749, filed on Oct. 25, 2016.

(51) Int. Cl.
*H04L 12/58* (2006.01)
*G06F 40/30* (2020.01)
*G06F 40/295* (2020.01)
*G06N 20/00* (2019.01)

(52) U.S. Cl.
CPC .......... *H04L 51/046* (2013.01); *G06F 40/295* (2020.01); *G06F 40/30* (2020.01); *G06N 20/00* (2019.01); *H04L 51/32* (2013.01)

(58) Field of Classification Search
CPC ....... H04L 51/046; H04L 51/32; G06N 20/00; G06F 17/2785
See application file for complete search history.

(56) References Cited

U.S. PATENT DOCUMENTS 8,606,792 B1* 12/2013 Jackson ................. H04L 51/32
 707/748
8,682,895 B1* 3/2014 Goel ....................... H04L 51/04
 707/732
8,903,909 B1* 12/2014 Marra .................... G06Q 50/01
 709/200

(Continued)

OTHER PUBLICATIONS

Allison Stadd, "Demographics Pro Offers the Equivalent of Nielsen Ratings for Twitter," Adweek, Jul. 18, 2013. Retrieved from <https://www.adweek.com/digital/demographics-pro-twitter> on Jul. 9, 2019. (Year: 2013).*

(Continued)

*Primary Examiner* — Daniel C Washburn
*Assistant Examiner* — Oluwadamilola M Ogunbiyi
(74) *Attorney, Agent, or Firm* — Smith Baluch LLP

(57) ABSTRACT

In general, techniques are described to determine engagement scores representative of a level of engagement in a digital domain for a particular sub-category within the common category of entities on a social media platform. In accordance with these techniques, a computing system is configured to receive, from one or more client devices, messages composed by one or more users of the one or more client devices. Each of the messages includes a respective identifier, and each respective identifier is associated with a common category of entities. The computing system is further configured to determine, based on the messages, an engagement score that represents a level of engagement for a particular sub-category within the common category of (Continued)

entities. The computing system is further configured to output, for display at a display device operatively connected to the computing system, a visual representation of the engagement score.

28 Claims, 4 Drawing Sheets

(56) References Cited

U.S. PATENT DOCUMENTS

| | | | | |
|---|---|---|---|---|
| 8,943,039 B1* | 1/2015 | Grieselhuber | ........ | G06F 16/951 707/709 |
| 9,043,397 B1* | 5/2015 | Ravichandran | ........... | H02J 1/14 370/328 |
| 9,081,777 B1* | 7/2015 | Krawczyk | ............... | G06F 16/41 |
| 9,418,117 B1* | 8/2016 | Molina | ............. | G06F 16/24578 |
| 9,892,431 B1* | 2/2018 | Agrawal | ........... | G06Q 30/0242 |
| 9,959,551 B1* | 5/2018 | Schermerhorn | ... | G06Q 30/0244 |
| 10,110,545 B1* | 10/2018 | Freay | ....................... | H04L 51/14 |
| 10,469,275 B1* | 11/2019 | Broomall | ............... | G06F 40/205 |
| 2009/0222551 A1* | 9/2009 | Neely | .................... | G06F 16/951 709/224 |
| 2011/0258045 A1* | 10/2011 | Chickering | ............ | G06Q 10/00 705/14.53 |
| 2012/0005224 A1* | 1/2012 | Ahrens | ................. | G06F 16/285 707/769 |
| 2012/0158456 A1* | 6/2012 | Wang | ................. | G06Q 30/0202 705/7.31 |
| 2012/0215861 A1* | 8/2012 | Smith | ..................... | H04L 51/12 709/206 |
| 2012/0233258 A1* | 9/2012 | Vijayaraghavan | ..... | G06Q 30/02 709/204 |
| 2012/0254152 A1* | 10/2012 | Park | ....................... | G06Q 30/02 707/710 |
| 2013/0054698 A1* | 2/2013 | Lee | .................... | G06Q 30/0259 709/204 |
| 2013/0124257 A1* | 5/2013 | Schubert | ................ | G06Q 30/02 705/7.29 |
| 2014/0040387 A1* | 2/2014 | Spivack | ............ | G06F 16/24578 709/206 |
| 2014/0122622 A1* | 5/2014 | Castera | ................... | H04L 51/32 709/206 |
| 2015/0095108 A1* | 4/2015 | Savelli | .............. | G06F 16/24578 705/7.29 |
| 2015/0100377 A1* | 4/2015 | Penumaka | ......... | G06Q 30/0201 705/7.29 |
| 2015/0235137 A1* | 8/2015 | Lawrence | .............. | G06Q 50/01 706/12 |
| 2015/0271557 A1* | 9/2015 | Tabe | .................. | H04N 21/6131 725/14 |
| 2015/0310504 A1* | 10/2015 | Potter | ................ | G06Q 30/0276 705/14.66 |
| 2016/0036973 A1* | 2/2016 | Harasimiuk | ............ | H04L 51/32 379/265.13 |
| 2016/0117397 A1* | 4/2016 | Bansal | ................ | G06F 16/9535 707/723 |
| 2016/0149850 A1* | 5/2016 | Pan | ......................... | H04L 51/32 709/206 |
| 2016/0210602 A1* | 7/2016 | Siddique | ............ | G06Q 20/0453 |
| 2017/0061469 A1* | 3/2017 | Garrity | ............. | G06Q 30/0242 |
| 2017/0262451 A1* | 9/2017 | Milner | ................... | G06Q 50/01 |
| 2017/0295404 A1* | 10/2017 | Meredith | ........... | H04N 21/4667 |
| 2017/0371868 A1* | 12/2017 | Zhang | ..................... | G06F 40/44 |
| 2017/0374508 A1* | 12/2017 | Davis | ................. | G06Q 30/0261 |
| 2018/0007084 A1* | 1/2018 | Reddy | ................. | H04L 63/1458 |
| 2018/0025078 A1* | 1/2018 | Quennesson | ........... | G06F 16/00 725/141 |
| 2018/0032636 A1* | 2/2018 | Mullaney | ................ | H04L 51/32 |
| 2018/0091963 A1* | 3/2018 | Cottle | ..................... | G06F 40/30 |
| 2019/0068540 A1* | 2/2019 | Chowdhury | ............ | H04L 51/26 |
| 2019/0197586 A1* | 6/2019 | Srivastava | ......... | G06Q 30/0269 |
| 2019/0238682 A1* | 8/2019 | Christiano | ............ | H04M 3/563 |

OTHER PUBLICATIONS

Demographics Pro—Understand & Grow your Social Audience, Retrieved on Feb. 13, 2016 from http://www.demographicspro.com/, 2 pgs.

\* cited by examiner

DETERMINING ENGAGEMENT SCORES FOR SUB-CATEGORIES IN A DIGITAL DOMAIN BY A COMPUTING SYSTEM

This application claims the benefit of U.S. Provisional Application No. 62/412,749, filed Oct. 25, 2016, the entire contents of which are incorporated by reference herein.

BACKGROUND

Computing devices, (e.g., smartphones, laptops, desktop computers) have enabled users to generate, distribute, and consume user-generated content across a broad range of topics and geographic areas. Information distributions platforms may allow users to identify specific topics of interest and share information related to the topics in a real- or near real-time manner. For example, an information distribution platform may allow users to label user-generated content with tags, (e.g., hashtags), which identify or otherwise associate a particular topic with the user-generated content. In this way, information distribution platforms may allow users to search for user-generated content associated with a particular topic or a particular market based on a hashtag. In some instances, discussions with regards to the market may influence how consumers view brands within that market.

SUMMARY

In some examples, a method includes receiving, by a computing system including one or more processors and from one or more client devices accessing a social media platform, messages composed by one or more users of the one or more client devices. Each of the messages includes a respective identifier, and each respective identifier is associated with a common category of entities. The method further includes determining, by the computing system and based on the messages and a machine learning model, an engagement score that represents a level of engagement in a digital domain for a particular sub-category within the common category of entities. The method also includes outputting, by the computing system and for display at a display device operatively connected to the computing system, a visual representation of the engagement score.

In some examples, a computing system includes at least one processor. The computing system also includes at least one non-transitory computer-readable storage medium storing instructions that are executable by the at least one processor to receive, from one or more client devices accessing a social media platform, messages composed by one or more users of the one or more client devices. Each of the messages includes a respective identifier, and each respective identifier is associated with a common category of entities. The instructions are further executable by the at least one processor to determine, based on the messages and a machine learning model, an engagement score that represents a level of engagement in a digital domain for a particular sub-category within the common category of entities. The instructions are also executable by the at least one processor to output, for display at a display device operatively connected to the computing system, a visual representation of the engagement score.

In some examples, a non-transitory computer-readable storage medium is encoded with instructions that, when executed, cause at least one processor of a computing system to receive, from one or more client devices accessing a social media platform, messages composed by one or more users of the one or more client devices. Each of the messages includes a respective identifier, and each respective identifier is associated with a common category of entities. The instructions further cause the at least one processor to determine, based on the messages and a machine learning model, an engagement score that represents a level of engagement in a digital domain for a particular sub-category within the common category of entities. The instructions also cause the at least one processor to output, for display at a display device operatively connected to the computing system, a visual representation of the engagement score.

The above techniques may enable a computing device to provide real-time analytics and feedback that may more accurately depict how the public in the digital domain views the particular sub-category in relation to other sub-categories within the common category of entities on the digital domain. In addition to determining an engagement score of the particular sub-category, the techniques of this disclosure may further include comparing the engagement score of the particular sub-category to engagement scores of additional brands within the same common category of entities. For instance, a computing device that performs the techniques described herein may automatically determine which competitor products or companies, which are in the same common category of entities for the particular sub-category, are also mentioned in the set of messages received by the computing device. As such, in addition to providing valuable information about a brand's presence in the digital domain, (e.g., in a social media platform) the techniques described herein may enable a computing device to provide valuable, real-time, direct comparisons that describe how the particular sub-category is being discussed in the digital domain in comparison to one or more competitors for the particular sub-category without prior knowledge of the specific competitors. This further enables the discovery of the most current and prevalent competitors in real-time. Techniques of this disclosure may thereby enable a computing device to provide more detailed and useful feedback regarding a particular sub-category's marketing effectiveness, which provides the distinct benefit of providing visual representations of the particular sub-category in relation to other competition in the common category of entities.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
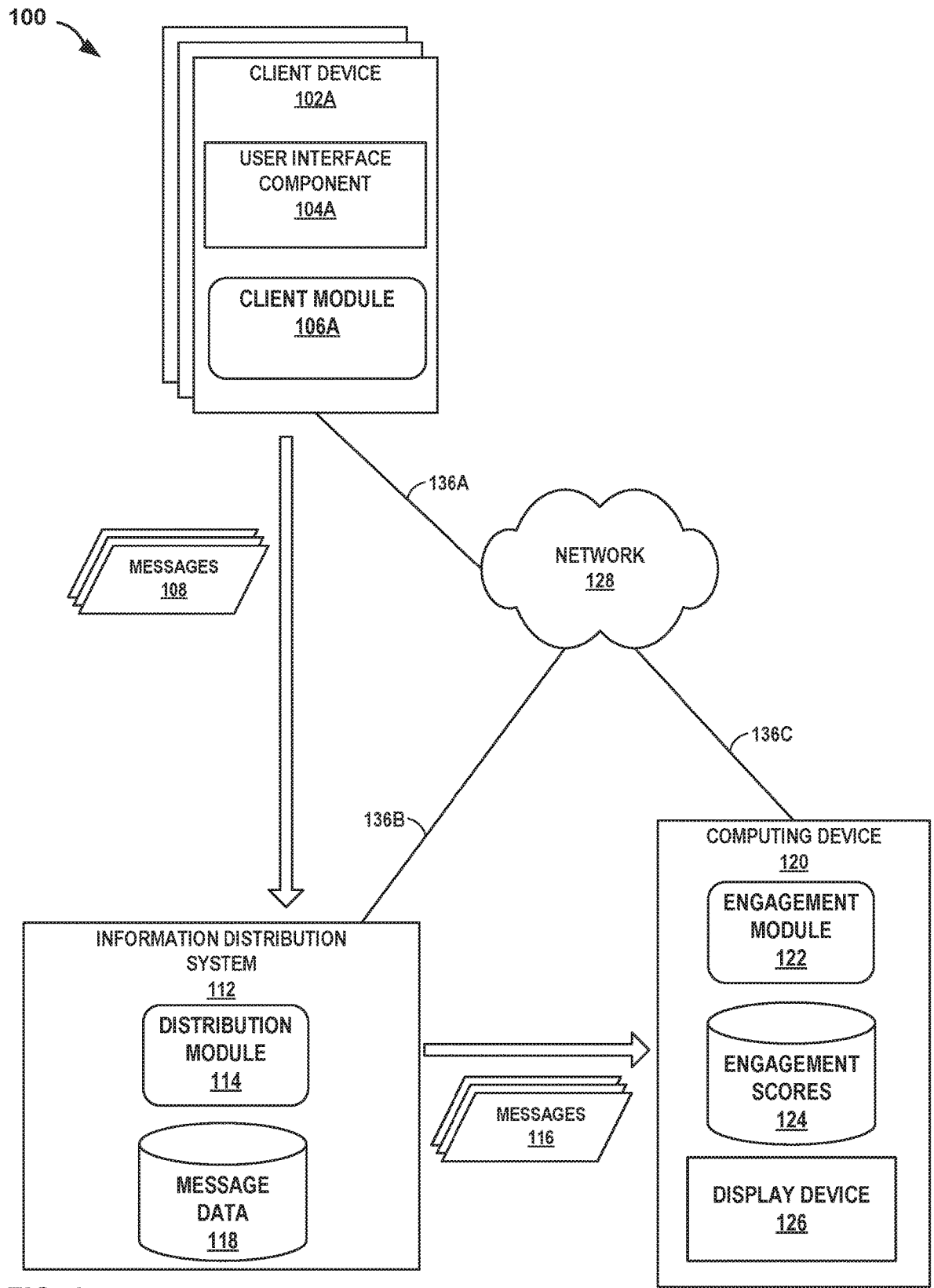
FIG. 1 is a conceptual diagram illustrating an example information distribution system (e.g., a social media platform) that is configured to detect levels of engagement in user-generated content for a particular sub-category within a common category of entities and to form visual representations based on the levels of engagement, in accordance with one or more aspects of the present disclosure.

Techniques of the disclosure are directed to detecting trends, buzz, and approval levels in user-generated content by analyzing user-generated content related to a common category of entities (e.g., a common product market) and determining where a particular sub-category of the entities (e.g., a particular brand) stands in relation to the other sub-categories within the common category of entities with regard to the particular sub-category's share of the overall conversation in a digital domain (e.g., a social media platform or any digital host where messages may be exchanged and viewed between users). For the purposes of this disclosure, the common category of entities and the common product market may be any general classification or category of a product or service being offered in the general marketplace (i.e., physical and/or digital markets). In one implementation, the system defines the general classification so that the set of elements that make up the common product market comprises only products or services that compete with the product or services under consideration. Classification can be defined programmatically, e.g., by leveraging machine learning to ascertain competitors, by human operators, or via a combination of the two. The more precisely the system defines the general classification, the better the system is at measuring buzz and detecting trends. Generally, a classification definition that is over inclusive would under estimate buzz, and a classification definition that is under inclusive would over estimate buzz.

To detect the particular sub-category's share (e.g., a magnitude of content or a percentage of content that references the particular sub-category) in such user-generated content, techniques of this disclosure may determine an engagement score that represents a level of engagement in a digital domain for the particular sub-category within the common category of entities in relation to competitors' brands within the common category of entities. In addition to the magnitude of content or the percentage of content that references the particular sub-category, the engagement score may be further influenced by whether the content that references the particular sub-category is generally positive, generally neutral, or generally negative in the way in which the content references the particular sub-category. A computing device or system that performs the engagement score determination may further output a visual representation of the engagement score such that a user may easily and intuitively analyze the engagement score and how the particular sub-category fares in the marketplace of ideas with relation to the other sub-categories within the same category of entities.

In addition to determining an engagement score of the particular sub-category, the techniques of this disclosure may further include comparing the engagement score of the particular sub-category to engagement scores of the other sub-categories within the common category of entities. For instance, a computing device that performs the techniques described herein may automatically determine which competitor products or companies that are in the same common category of entities as the particular sub-category are also mentioned in the set of messages received by the computing device. The computing device can then generate engagement scores for each of the competitor products or companies and provide a comparison between the competitor engagement scores and the engagement score of the particular sub-category. As such, in addition to providing valuable information about a brand's presence on a social media website, the techniques described herein may enable a computing device to provide valuable direct comparisons that describe how the particular sub-category is being discussed in the digital domain in comparison to one or more competitors of the particular sub-category without prior knowledge of the specific competitors. This further enables the discovery of the most current and prevalent competitors in real-time.

Rather than merely determining the amount of content generated using a particular word or hashtag, narrowing the population of user-generated content to only messages that reference a common category of entities may more accurately depict how the public views the particular sub-category within the common category of entities. For instance, the common category of entities may not be referenced in the digital domain by a lot of content, but if the particular sub-category is referenced in a large proportion of the user-generated content in the digital domain related to the common category of entities, then a user may want to continue utilizing effective techniques for social outreach. If the particular sub-category, however, was analyzed only in the context of all possible user-generated content, rather than in the context of only the common category of entities, then the same user may mistakenly think that current marketing techniques are ineffective and make negative changes.

Conversely, if a common category of entities is referenced by a large amount of user-generated content in the digital domain, even if the particular sub-category generates a lot of content, if the particular sub-category is referenced in a small proportion of the user-generated content in the digital domain related to the common category of entities, the user may want to change their current marketing techniques so to obtain a larger share of the market with relation to the other sub-categories within the same category of entities. If the particular sub-category, however, was analyzed only in the context of all possible user-generated content in the digital domain, rather than in the context of only the common category of entities, then the same user may mistakenly think that their current marketing techniques are effective due to the large amount of content that reference the particular sub-category, not knowing that competitors are experiencing more success in social media. Techniques of this disclosure may thereby enable a computing device provide more detailed and useful feedback regarding a particular sub-category's marketing effectiveness, which provides the distinct benefit of providing visual representations of the particular sub-category in relation to other competition in the common category of entities.

Modern social media platforms, on which the techniques described herein may be implemented, are generally massive in scale. Some social media platforms handle thousands of new, unique messages posted to the platform every second, meaning that hundreds of millions of new messages are posted to the platform every day, and hundreds of billions of new messages are posted to the platform every year. Furthermore, with the pace that these messages are added to the social media platform, the population of messages is constantly growing. As such, for a user seeking to analyze their presence in the digital space among the millions of active users accessing the social media platform, it would be very difficult, if not impossible, to analyze all of the content of each new message posted to the social media platform.

Using the techniques described herein, a computing device may, at any given moment, take a snapshot of how the user or the user's brand is being perceived and discussed as compared to the user's competitors. This real-time feedback of the user's products and marketing schemes is valuable to the user. Further, by implementing these techniques on a social media platform that is ever-changing and highly volatile in the content and sentiment towards that content, a user may gather almost immediate feedback to different messages that are output by the computing device. By developing a machine learning model that narrows down the universe of messages on the social media platform to messages dealing only with a common category of entities, the computing device saves processing time and reduces the amount of inputs required to gather this information, as opposed to what could be a huge or nearly infinite number of manual queries that, due to the time it would take to process each query and analyze the results, would be outdated before the results are even ascertained.

FIG. 1 is a conceptual diagram illustrating a system 100 that is configured to detect levels of engagement in user-generated content for a particular sub-category within a common category of entities and to form visual representations based on the levels of engagement associated with the user-generated content, in accordance with one or more aspects of the present disclosure. System 100 includes client device 102A, information distribution system 112, computing device 120, and network 128.

Network 128 represents any communication network (e.g., public, private, commercial, governmental, or residential) that communicatively links two or more computing devices or systems for the transmission of information. For example, network 128 may be a wireless and/or wired network for transmitting data between two or more computing devices located at two or more different physical locations. In some examples, network 128 may represent the Internet. Client device 102A, information distribution system 112, and computing device 120 may send and receive data via network 128 using various suitable communication techniques. For instance, data may be transmitted between the devices using communication links 136A-136C, which may be wired and/or wireless. Network 128 may include any required hardware for communicatively linking computing client device 102A, information distribution system 112, and computing device 120. For example, network 128 may include various switches, hubs, routers, and other network equipment that provides for the exchange of information between the devices.

Client device 102A represents any type of computing device from which a person can view, listen to, feel, or otherwise obtain output based on information received via a network, (e.g., network 128). For example, client device 102A may be a laptop computer, a mobile telephone, phones, a tablet computers, a set-top box, a desktop computer, a server, a mainframe, a wearable device (e.g., a watch, computerized glasses, and the like), a personal digital assistant (PDA), a gaming system, a media player, an e-book reader, a television platform, a digital media player, an automobile navigation and/or entertainment system, or any other type of mobile and/or non-mobile computing device that is configured to communicate (e.g., transmit and receive data) across a network and output information received via the network to a user.

Client device 102A includes user interface component 104A. User interface component 104A may include various technologies for receiving input from, and/or outputting information to, a user of client device 102A. For example, user interface component 104A may include a microphone, a touch screen or other type of presence-sensitive screen, and other types of sensors and input devices for receiving input from a user. User interface component 104A may include a display (e.g., liquid crystal (LCD), light emitting diode (LED), organic light-emitting diode (OLED), or any other type of display), a speaker, a haptic feedback device, or any other type of output device for outputting visible, audible, and/or haptic feedback type information to a user of client device 104A. Although illustrated as a presence-sensitive display integrated with client device 102A, in some examples, user interface component 104A may be a display device, for example, a monitor integrated in a laptop computer, or a standalone monitor coupled to a desktop computing device, to name only a few examples.

User interface component 104A may provide a user interface from which a user may interact with client device 102A to cause client device 104A to perform one or more operations. For example, user interface component 104A may give a user access to a service, provided by information distribution system 112, for receiving content (e.g., social media, news, television, streaming audio, streaming video, or other types of content) distributed across network 128. As further described in this disclosure, information distribution system 112 may provide content via network 128 to client device 102A. Client device 102A may process and output the content as one or more graphical images, sounds, and haptic-feedback sensations, at user interface component 104A.

Client device 102A may include a client module 106A. Client module 106A may send information generated by a user to and receive information from an information network provided by information distribution system 112. For instance, a user may have a user account stored at information distribution system 112. The user account may include a unique identifier (e.g., a username) for the user, authentication credentials, and personal information (e.g., name, phone number, email address, home address, to name only a few examples). Client module 106A may authenticate with information distribution system 112 based on authentication credentials provided by the user to client device 102A.

In some examples, client module 106A may provide a graphical user interface (GUI) that enables a user to generate or otherwise compose user content that client module 106A sends to information distribution system 112. Such user content may include text, images, video, and/or audio information. In some examples, a user may compose a message that includes various content. In addition to content, a message may include one or more hashtags and/or mention tags. In some examples, a hashtag may represent or otherwise identify a particular topic associated with the content of a message. As such, a user composing a message on a particular topic may associate hashtag for the topic with the message. A mention tag may represent or otherwise identify a particular user that has a corresponding user account at information distribution system 112. A user composing a message who wishes to refer to or address another particular user may associate a mention tag for the particular user with the message. When a user generates messages 108, client module 106A may send messages 108 to information distribution system 112, which may process and/or distribute the user content as further described in this disclosure.

Client module 106A may enable the user to perform one or more functions associated with user content. For instance, client module 106A may enable a user to "share," "re-share," "read," and "follow" content as well as "follow" and "mention" other users. In some examples, "sharing" a message or content may refer to composing an original message or original content that is subsequently distributed by information distribution system 112 to other users. In some examples, "re-sharing" a message or content may refer to an operation initiated by a user to re-post a message or content that was originally generated by another user. In some examples, "reading" a message or content may refer to an activity of a user to view the message or content. In some examples, "following" may refer to an operation initiated by a user to subscribe to messages and/or user content of another user. As such, a user that follows a particular user may receive updates of messages and/or user content generated by the particular user. In some examples, "mentioning" a particular user may refer to an operation initiated by a user to identify or otherwise associate the particular user with a message or user content.

Client module 106A may perform operations described herein using software, hardware, firmware, or a mixture of both hardware, software, and firmware residing in and executing by client device 102A or at one or more other remote computing devices. As such, client module 106A may be implemented as hardware, software, and/or a combination of hardware and software. Client device 102A may execute client module 106A as or within a virtual machine executing on underlying hardware. Client module 106A may be implemented in various ways. For example, client module 106A may be implemented as a downloadable or pre-installed application or "app." In another example, client module 106A may be implemented as part of an operating system of client device 102A.

As shown in FIG. 1, system 100 also includes information distribution system 112. Information distribution system 112 may act as an intermediary between a group of one or more client devices, including client device 102A, and computing device 120. In other words, information distribution system 112 may receive user-generated content from the group of one or more client devices and forward the user-generated content to computing device 120. Information distribution system 112 may be implemented as one or more computing devices, including desktop computers, laptop computers, mainframes, servers, cloud computing systems, and the like.

Information distribution system 112 may include data and one or more modules, that when executed perform one or more operations. For example purposes, information distribution system 112 includes distribution module 114 and message data 118; however, information distribution may include more or fewer modules or data in other examples. Message data 118 may include data representing user accounts and demographic data about each user. As described above, a user account for a user of information distribution system 112 may include, but is not limited to, a user name, password, phone number, email address, and home address. In some examples, message data 118 may also include a current location of the user, devices authenticated with the user, interests of the user, history of content generated by the user, history of content read and/or followed by a user, hashtags and/or mention tags used by the user, other users followed by the user, other users following the user, private messages sent and/or received by the user, and/or search history of the user, to name only a few examples. Message data 118 may further include messages and their content from the group of one or more client devices. In other words, message data 118 may include all aspects of the user-generated content, including the content itself and all of the description information of the user-generated content.

Information distribution system 112 may also include distribution module 114. Distribution module 114 may construct and maintain information generated by users and/or operators of information distribution system 112. Distribution module 114 may receive messages 108 from one or client devices, and store and organize the user content in the information network. The user content may be stored and organized using any number of datastores and data structures, (e.g., graphs, lists, tables, inverted index data structures, a Relational Database Management System (RDBMS), an Object Database Management System (ODBMS), and/or an Online Analytical Processing (OLAP) system).

Distribution module 114 may parse or analyze user content to share or otherwise redistribute the user content to other users of information distribution system 112. For example, numerous users may each share or re-share content for a particular topic, and include or associate hashtag for the topic with the content. As an example, multiple users may each share content about the Olympics and include a hashtag #Olympics with the content (e.g., text and/or pictures). Distribution module 114 may receive the content and parse the hashtag #Olympics to structure content associated with the hashtag as searchable. In this way, if a user wishes to view all content associated with #Olympics, the user may submit a query to distribution module 114, which may return a set of content or messages that include the hashtag #Olympics. In some examples, distribution module 114 may automatically send to a user's client device, without additional user intervention, content or messages that include the hashtag #Olympics, if the user previously searched for, shared, re-shared, and/or viewed content associated with the hashtag #Olympics.

Distribution module 114 may parse or analyze user content to share or otherwise redistribute the user content to other users of information distribution system 112 based on whether a user is following another particular user or has mentioned the particular user. For instance, if the user provides user input to client module 106A to follow a particular user, information distribution system 112 may receive an indication of the user input and store the indication with the user's account. When the particular user shares or re-shares content, information distribution system 112 may send the content to client device 102A such that the user can view the content. As another example, if the user mentions the particular user in shared or re-shared content, information distribution system 112 may receive the content and send the content or notification of the mention to a client device of the particular user that was mentioned. In some examples, distribution module 114 may store information about user content viewed by a particular user. For instance, client module 106A may send data that indicates the user has viewed specific user content to information distribution system 112. Distribution module 114 may store data that indicates the user has viewed the specific user content. Although a number of examples above have described how distribution module 114 determines relationships between user content and redistributes user content to client devices, many other examples of distributing content and determining relationships are also possible.

In some instances, the amount of content associated with a particular hashtag may grow or decline rapidly relative to content associated with other hashtags. The rapid change may be due to a particular event, controversy, person, or topic that captures or loses the interest of a large audience of users. Such change in the increase or decrease of content associated with the hashtag may represent a trend. A magnitude of a trend may represent the degree of interest or engagement by an audience of users. For instance, if a magnitude of a trend is high, the degree of interest by the audience of users may be high. As an example, there may be relatively more users in the audience and those users may be more engaged in content for the particular event, controversy, person, or topic. Conversely, if a magnitude of a trend is low, the degree of interest by the audience of users may be low. As an example, there may be relatively fewer users in the audience and those users may be less engaged in content for the particular event, controversy, person, or topic.

In some examples, distribution module 114 may, in addition to re-distributing user content to client devices as described above, send targeted content to client devices for display. Targeted content may include, but is not limited to, promotions, offers, rewards, discounts, political information, public interest information, entertainment information, sports information, or any other informational content.

As shown in FIG. 1, system 100 also includes computing device 120. Computing device 120 may implement techniques of this disclosure to detect levels of engagement in user-generated content for particular brands within a common product market and to form visual representations based on the levels of engagement associated with the user-generated content. Computing device 120 may be implemented as one or more computing devices, including desktop computers, laptop computers, mainframes, servers, cloud computing systems, or the like.

Computing device 120 may include display device 126. Display device 126 of computing device 120 may include respective input and/or output components for computing device 120. In some examples, display device 126 may function as input component using presence-sensitive input component 5 (e.g., a resistive touchscreen, a surface acoustic wave touchscreen, a capacitive touchscreen, a projective capacitance touchscreen, a pressure sensitive screen, an acoustic pulse recognition touchscreen, or another display component technology). Display device 126 may also include a display component that can output content in a graphical user interface in accordance with one or more techniques of the current disclosure (e.g., a liquid device crystal display (LCD), a dot matrix display, a light emitting diode (LED) display, an organic light-emitting diode (OLED) display, e-ink, or similar monochrome or color displays capable of outputting visible information to a user of computing device 120). Display device 126 may be integral to the computing device 120 or remote.

Computing device 120 may include data and one or more modules, that when executed perform one or more operations in accordance with the techniques of this disclosure. For example purposes, computing device 120 includes engagement module 122 and engagement scores 124; however, computing device 120 may include more or fewer modules or data in other examples. Engagement scores 124 may include data representing user accounts, demographic data about each user, user-generated content regarding a common product market that a particular brand fits within, and engagement scores that represent a level of engagement in a digital domain for a particular brand within the common product market.

Computing device 120 may also include engagement module 122. Engagement module 122 may construct and maintain information generated by users and/or operators of computing device 120. Brand module 120 may receive messages 116 from information distribution system 112, and store and organize the user content within computing device 120. The user content may be stored and organized using any number of datastores and data structures (e.g., graphs, lists, tables, inverted index data structures, a Relational Database Management System (RDBMS), an Object Database Management System (ODBMS), and/or an Online Analytical Processing (OLAP) system).

Each of the messages received by engagement module 122 of computing device 120 may be composed by one or more users of the one or more client devices accessing a social media platform. Further, each of the messages may include a respective identifier (e.g., a market identifier) that is associated with a common product market. For instance, in the example of FIG. 1, the common product market may be cars. As such, each of the messages may include a market identifier that is associated with cars. For instance, a message may include any of the words "car," "truck," "van," "drive," "SUV," "ride," a brand name of a car, a make and/or model of a car, or any other market identifier that one would ordinarily associate with a car. In some examples, information distribution system 112 may only send messages to computing device 120 that include the respective market identifiers that associate the messages with the common product market. In other instances, information distribution system 112 may send a larger group of messages to computing device 120. In such instances, engagement module 122 of computing device 120 may pare down the received group of messages by disregarding any messages that do not include a market identifier that associates the message with the common product market.

Engagement module 122 of computing device 120 may determine an engagement score that represents a level of engagement in a digital domain for a particular brand within the common product market based on the received messages 116 and a machine learning model. In some instances, the engagement score may be based on the number of messages that include a reference to the particular brand. In other instances, the engagement score may be a percentage of the messages that include the reference to the particular brand relative to a total number of received messages associated with the common product market. For example, when the common product market is cars, engagement module 122 may determine an engagement score for the particular type of car brand X. Engagement module 122 may determine the number of messages in the digital domain that include specific or learned references to brand X. Specific references may include, for example, the words "brand X", "Model A", "Model B", "Model C", any other reference to a particular model of a brand X vehicle, any slogan commonly used by brand X, or any other content that one would ordinarily associate with brand X. However, specific references may not be necessary. For the learned references, engagement module 122 may utilize machine learning techniques to select terms. For example, if the user-generated content commonly includes a nickname for brand X or somehow includes particular descriptors of brand X without specifically referencing brand X, engagement module 122 may (e.g., based on machine-learning techniques) include these messages in the total number of messages selected that reference brand X. Based on these messages that include the reference to the particular brand X, engagement module 122 may determine an engagement score that represents a level of engagement in a digital domain for the particular brand X within the common product market of cars.

Machine learning techniques may include any techniques that enable engagement module 122 to update its vocabulary to more accurately and more efficiently identify messages that reference a particular product market, a particular brand within the product market, or a particular product for the brand. For instance, engagement module 122 may utilize one or more of decision tree learning, association rule learning, artificial neural networks, deep learning, inductive logic programming, support vector machines, clustering, Bayesian networks, reinforcement learning, representation learning, similarity and metric learning, sparse dictionary learning, and/or rule-based machine learning in implementing machine learning techniques. Engagement module 122 may utilize machine learning techniques to analyze messages and separate messages into the correct product market, especially when brands and/or products have names that are exceptionally similar (e.g., the difference between a fruit and a technology company).

One example machine learning technique that engagement module 122 may leverage includes a neural network system. Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

A neural network system may receive multiple input feature values and process the input feature values to generate one or more network outputs. Each input feature value may describe a particular feature of an input data item, and each network output may describe a computed property of the input data item. For example, an input feature value may describe a common product market, or a particular brand and/or product. As another example, an input feature value may describe a feature, e.g., a count of likes, a count of shares, a count of occurrence of a particular word or phrase, and so on, of a social media posting, e.g., a tweet, and a network output may describe a predicted user interest for a particular user in the social media posting. Each input feature value belongs to an input feature value type and has a raw value. An input feature value type indicates the feature of the input data item that the corresponding input feature value describes. The raw value in an input feature value is a value assigned to the input feature value type.

The neural network system may include a discretization layer, a sparse calibration layer, and one or more additional layers. The discretization layer determines a total range of values for each input feature value type and discretizes these features prior to being fed into the main deep neural network. A total range of values for an input feature value type includes a minimum value and a maximum value for the input feature value type. The discretization layer can determine a minimum and a maximum value of input feature values belonging to an input feature value type in a collection of input training data as the minimum value and the maximum value for the input feature value type respectively. The discretization layer can also use a predetermined minimum value and maximum value for the input feature values belonging to a particular input feature value type as the minimum value and the maximum value for the particular input feature value type respectively. The discretization layer divides, for each input feature value type, the total range of values for the input feature value type into multiple bins, e.g., multiple bins that each include an equal range of possible values. Each bin includes a range of possible values in the total range of values for the input feature value type.

By converting an input feature value to multiple discretized feature values that each has a significant variance in value, the neural network system can increase the significance of the feature values used by the additional layers to make inferences and generate multiple useful pieces of information from the input feature value. By doing this, the neural network system can increase the accuracy of inferences made by the additional layers. This technique is especially useful for processing collections of input feature values that are generally sparse, e.g., generally include mostly zero or low values.

A sparse calibration layer of the neural network system obtains the discretized feature values and generates refined feature values by normalizing the discretized feature values to generate normalized feature values and applying a type-specific bias value to each normalized feature value. This layer has two main extras compared to other sparse layers out there, namely an online normalization scheme that prevents gradients from exploding, and a per-feature bias to distinguish between the absence of a feature and the presence of a zero-valued feature. The sparse calibration layer can normalize a discretized feature value by dividing a value associated with a discretized value type of the discretized feature value by a maximum value for the input feature value type that corresponds to an input feature value using which the discretized feature value is generated. The sparse calibration layer also applies, e.g., adds, a type-specific bias value to each normalized feature value. A type-specific bias value is associated with a particular input feature value type and is common to all normalized feature values that are generated using input feature values belonging to the particular input feature value type.

Another layer of the neural network system may include a sampling scheme layer associated with a calibration layer. Stacked neural networks usually explore the space of solutions much better when the training dataset contains a similar number of positive and negative examples. However, hand-tuning a training dataset in this manner may lead to uncalibrated output predictions. Thus, a custom isotonic calibration layer may recalibrate and output actual probabilities.

The additional layers of the neural network system may include one or more other neural network layers, such as one or more feedforward fully-connected layers, one or more feedforward convolutional layers, one or more recurrent layers, one or more testing layers, one or more softmax layers, one or more calibration layers, and the likes. The additional layers process the refined feature values to generate the network outputs.

A training engine can train the sparse calibration layer and the additional layers using any neural network training algorithm, such as a training algorithm that relies on back-propagation with gradient descent. The training engine can use observed data, such as observed data about user engagement and/or interest in a social media posting through likes, re-sharings, and so on, as the target output data for training.

Machine learning models that include, or wholly comprise, neural networks may be specifically suited for use in large-scale social media platforms with heavy latency. Neural networks may provide the machine learning capability to update dictionaries and contexts for common product markets, specific brands, and specific products, while operating in an environment that requires low latency and high accuracy in order to provide at least a satisfactory user experience.

Deep learning models, such as the stacked neural network system described above, are models that are intrinsically modular. Deep learning modules may be composed in various ways (stacked, concatenated, etc.) to form a computational graph. The parameters of this graph may then be learned, such as by using back-propagation and stochastic gradient descent on mini-batches.

Low-level modules used by deep learning models that may be any hardware or software module configured to compute the output from input and necessary gradients. Some such modules may perform basic operations on chunks of data, potentially letting the user specify the algorithm in its preferred tensor manipulation package, and trusting the library to generate the computational graph itself. In other examples, the computational graph may be dynamic and change from one mini-batch to the other. Deep learning techniques may also be scalable, as these models learn from mini-batches of data, the total dataset size can be arbitrarily large.

Engagement module 122 may also utilize a user feedback system, where messages that are incorrectly included in the counts for the engagement score, as indicated by users of the system are analyzed. Engagement module 122 may determine particular language used in the incorrect messages to build its contextual knowledge, removing future messages that include similar language from consideration when determining the engagement score. Similarly, engagement module 122 may receive an indications of user input to include particular messages that were previously excluded. In such instances, engagement module 122 may analyze the language of such messages to determine particular language used in the correct messages to build its contextual knowledge, including future messages that include similar language for consideration when determining the engagement score.

Engagement module 122 of computing device 120 may further output, for display at display device 126, a visual representation of the engagement score (e.g., a chart, a graph, a list, or a table). This may enable computing device 120 to display a clear and intuitive visual representation of the particular brand's engagement score and how the particular brand may compare with other brands within the same common product market. From this visual representation, a user of computing device 120 may effectively determine future marketing strategies and current marketing effectiveness, as computing device 120 provides a depiction of the particular brand's share of the market conversation with regards to the common product market.

Figure 2:
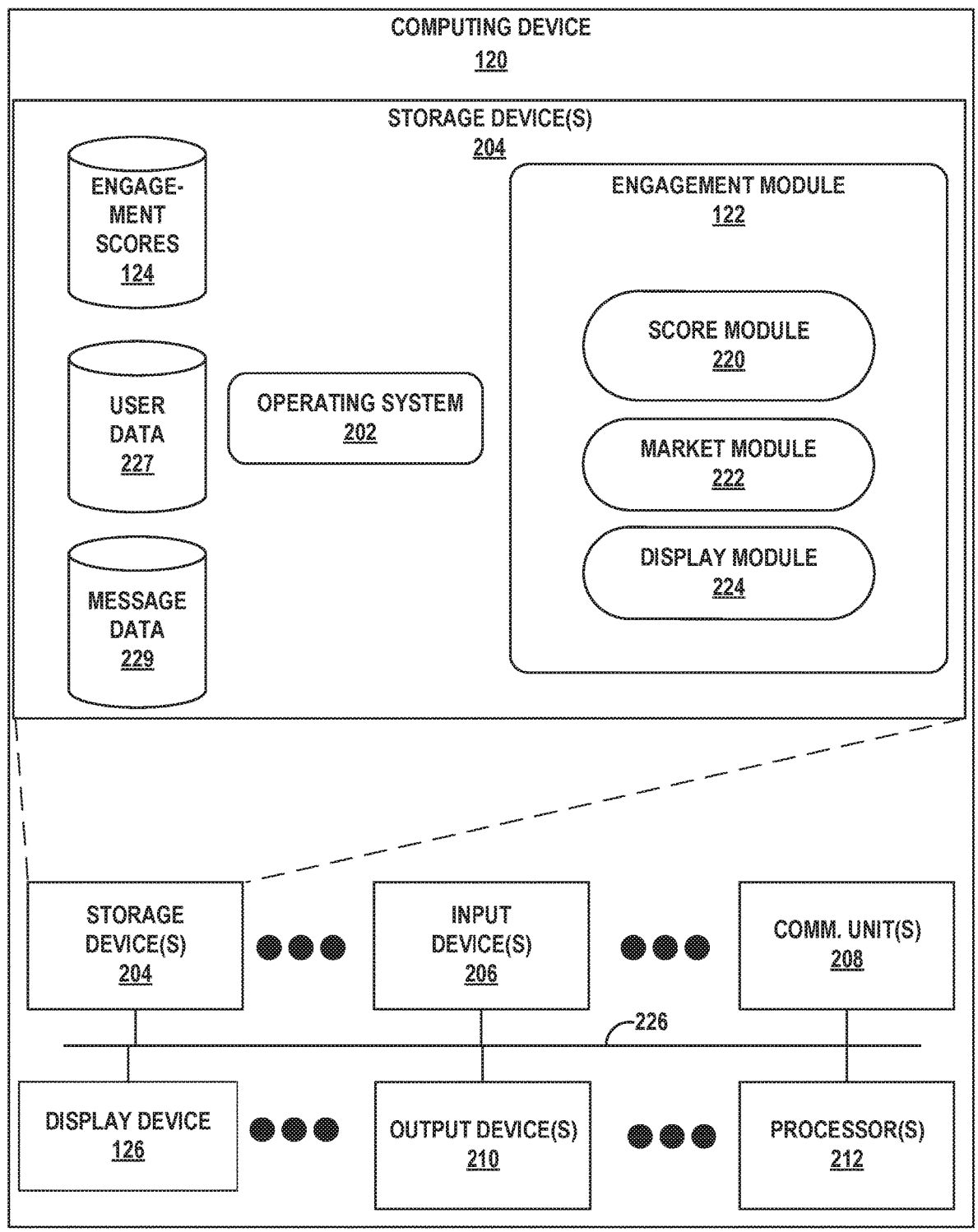
FIG. 2 is a block diagram illustrating further details of an example computing system that is configured to detect levels of engagement in user-generated content for a particular sub-category within a common category of entities and to form visual representations based on the levels of engagement, in accordance with one or more aspects of the present disclosure.

FIG. 2 is a block diagram illustrating further details of an example computing device 120 that is configured to detect levels of engagement in user-generated content for a particular sub-category within a common category of entities and to form visual representations based on the levels of engagement associated with the user-generated content, in accordance with one or more aspects of the present disclosure. Computing device 120 of FIG. 2 is described below within the context of FIG. 1. FIG. 2 illustrates only one particular example of computing device 120, and many other examples of computing device 120 may be used in other instances and may include a subset of the components included in example computing device 120 or may include additional components not shown in FIG. 1.

As shown in the example of FIG. 2, computing device 120 includes one or more storage devices 204, one or more input devices 206, one or more communication units 208, one or more output devices 210, one or more processors 212, and one or more communication channels 226. One or more storage devices 204 may include engagement module 122, engagement scores 124, user data 227, message data 229, and operating system 202. Engagement module 122 includes score module 220, market module 222, and display model 224.

Communication channels 226 may interconnect each of the components 202-229 for inter-component communications (physically, communicatively, and/or operatively). In some examples, communication channels 226 may include a system bus, a network connection, an inter-process communication data structure, or any other method for communicating data.

One or more input devices 206 of computing device 120 may receive input and one or more input devices 206 may generate output. Examples of input are tactile, audio, and video input and examples of output are tactile, audio, and video output.

One or more communication units 208 may allow computing device 120 to communicate, via one or more wired and/or wireless networks, with external devices and/or systems. For example, communication units 208 may transmit and/or receive network signals being transmitted and received other devices and/or systems connected to network 128. Examples of communication units 208 include network interface cards (e.g. an Ethernet card), optical transceivers, radio frequency transceivers, GPS receivers, or any other type of device that can send and/or receive information via a network. Other examples of communication units 208 may include long- and short-wave radios, cellular data radios, wireless network radios, as well as universal serial bus (USB) controllers.

One or more storage devices 204 of computing device 120 may store information or instructions that computing device 120 processes during operation of computing device 120. For example, storage devices 204 may store data that modules or components may access during execution at computing device 120. In some examples, storage devices 204 are temporary memories, meaning that a primary purpose of storage devices 204 is not long-term storage.

Storage devices 204 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 204 may be configured to store larger amounts of information than volatile memory and may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories.

Storage devices 204, in some examples, include one or more computer-readable storage media. In some examples, storage devices 204 represent non-transitory computer readable storage medium that store instructions later executed by one or more processors 212 during operation of computing device 120. For example, storage devices 204 may store program instructions and/or information (e.g., data) associated with modules and/or components 122, 124, 202, 220, 222, 224, 227, and 229.

One or more processors 212 may implement functionality and/or execute instructions within computing device 120. For example, processors 212 on computing device 120 may receive and execute instructions stored by storage devices 204 that execute the functionality of modules 122, 124, 202, 220, 222, 224, 227, and 229. The instructions executed by processors 212 may cause computing device 120 to read/write/etc. information, for example, one or more data files at user data 118 and/or analytics data 227 and stored within storage devices 204 during program execution. Processors 212 may execute instructions of modules 122, 124, 202, 220, 222, 224, 227, and 229 to cause computing device 120 to perform the operations described in this disclosure. That is, modules 122, 124, 202, 220, 222, 224, 227, and 229 may be operable by processors 212 to perform various actions or functions of computing device 120, for instance, detecting magnitudes of trends in user-generated content and facilitating the delivery of targeted content based on demographic data of the one or more users associated with the user-generated content, in accordance with one or more aspects of the present disclosure.

In some examples, computing device 120 may include display module 224. Display module 224 may generate one or more graphical user interfaces that may be displayed at content provider systems. In some examples, display module 224 may provide one or more Representational state transfer (RESTful) interfaces, web services, or other application programming interfaces that may send and receive information with content distribution systems. In some examples, display module 224 may send alerts or notifications to content provider systems as described in FIG. 1 based on thresholds for hashtags that are satisfied.

In some examples display module 224 may generate, store, and send one or more web pages that provide one or more graphical user interfaces for content providers. For instance, display module 224 may generate and send demographic data, trending score information, hashtag information, and any other information, in web pages to content provider systems for display. As such, display module 224 may provide a "portal" or "dashboard" through which content providers may interact with computing device 120. Display module 224 may also receive data from content providers, including but not limited to: targeted content, bids to distribute targeted content, alert/notification preferences, criteria for setting thresholds to name only a few examples. Display module 224 may also receive user input from content provider systems that specifies where and/or how (e.g., shape, size) targeted content will be displayed within a graphical user interface of a client device. For instance, display module 224 may provide a one-click campaign setup graphical user interface in which a content provider can select target content to target an audience of users associated with the particular hashtag. The one-click setup may include presenting a set of potential instances of targeted content from which a content provider may select a particular instance of targeted content to distribute to one or more users associated with the particular hashtag. Display module 224 may also authenticate content providers that attempt to access computing device 120 based on credentials that are stored in user data 227.

Display module 224 may generate a graphical user interface that includes a set of top-N trending hashtags. In some examples, N may be set by an operator of computing device 120 or a content provider system. As an example, display module 224 may send a content provider a set of top 10 trending hashtags. The top-N trending hashtags may each be a hashtag that includes a trending score that satisfies a threshold, as described in FIG. 1. Accordingly, the top-N trending hashtags may each be a hashtag that includes a trending score that satisfies a threshold based on one or more criteria set by a content provider. Display module 224 may generate a graphical user interface that includes demographic data of users associated with each hashtag. As described in this disclosure, engagement module 122 may aggregate, summarize, or divide the demographic data across any dimension, and in some examples, based on one or more user inputs provided by a content provider. Display module 224 may send such demographic data to content providers. Display module 224 may also send trending scores or data representing the trending scores for hashtags to a content provider. In some examples, display module 224 may send information for display to a content provider that indicates, for a particular hashtag, a set of top-N messages. For instance, the top-N messages may be the top-N message that were read and/or re-shared by other users. In some examples, display module 224 may send information for display to a content provider that indicates a geographic map or "viral footprint" of where and/or how fast the particular hashtag is being shared, re-shared, and/or viewed, which may indicate the potential size and/or reach of the particular hashtag. In some examples, each instance of a particular hashtag associated with a message that is shared, re-shared, and/or viewed is represented by a point on a map.

In some examples, display module 224 may send statistical information to a content provider for targeted content in which the content provider won a bid (e.g., the targeted content was distributed by computing device 120). In some examples, the statistical information may include a number of client devices that received the targeted content. In some examples, the statistical information may include a number of users that viewed and/or clicked on the targeted content. In some examples, the statistical information may include a percentage of users associated with the hashtag that viewed and/or clicked on the targeted content (e.g., "share of voice"). In some examples, display module 224 may provide the statistical information on a real-time basis to a content provider system as the statistical information is generated by display module 224.

As shown in FIG. 2 computing device 120 also includes engagement module 122 as previously described in FIG. 1. Engagement module 122 includes score module 220, market module 222, and display model 224, each of which are described in further detail in FIG. 2.

In accordance with the techniques of this disclosure, market module 222 may receive messages from an information distribution system (e.g., information distribution system 112 of FIG. 1), and store and organize the user content within computing device 120 in user data 227 and message data 229. The user content may be stored and organized using user data 227 and message data 229, which may be any number of datastores and data structures (e.g., graphs, lists, tables, inverted index data structures, a Relational Database Management System (RDBMS), an Object Database Management System (ODBMS), and/or an Online Analytical Processing (OLAP) system).

Each of the messages received by market module 222 of computing device 120 may be composed by one or more users of the one or more client devices accessing a social media platform. Further, each of the messages may include a respective market identifier that is associated with a common product market. In general, the market identifier may be any one of a word, a phrase, or a hashtag indicative of the common product market. For instance, in the example of FIG. 2, the common product market may be coffee. As such, each of the messages may include a market identifier that is associated with coffee. For instance, a message may include any of the words "coffee," "decaf," "creamer," "macchiato," "latte," "cappuccino," "jolt," "caffeine," a brand name of a coffee, another type of coffee drink, a particular coffee house or coffee shop, or any other market identifier that one would ordinarily associate with a coffee. In some examples, the information distribution system may only send messages to computing device 120 that include the respective market identifiers that associate the messages with the common product market. In other instances, information distribution system 112 may send a larger group of messages to computing device 120. In such instances, score module 220 of computing device 120 may pare down the received group of messages by disregarding any messages that do not include a market identifier that associates the message with the common product market.

Score module 220 of computing device 120 may determine an engagement score that represents a level of engagement in a digital domain for a particular brand within the common product market based on the received messages in message data 229 and a machine learning model. In some examples, score module 220 may determine a number of messages in the received messages that include a reference to the particular brand and determine the engagement score based on the number of messages in the received messages that include the reference to the particular brand. In some instances, the engagement score may be based on the number of messages that include a reference to the particular brand. In other instances, the engagement score may be a percentage of the messages that include the reference to the particular brand relative to a total number of received messages associated with the common product market. For example, when the common product market is coffee, score module 220 may determine an engagement score for a particular coffee drink produced by brand S. As such, score module 220 may determine the number of messages that include specific or learned references to the particular coffee drink by brand S. Specific references may include, for example, the words "brand S", the name of the particular coffee drink, a nickname for the particular coffee drink or brand S, any slogan commonly used by brand S with regards to the particular coffee drink, or any other content that one would ordinarily associate with brand S and their particular coffee drink. Further, for the learned references, score module 220 may utilize machine learning techniques to select terms. For example, if the user-generated content commonly includes a nickname for brand S or somehow includes particular descriptors of brand S without specifically referencing brand S, score module 220 may include these messages in the total number of messages selected that reference brand S. Based on these messages that include the reference to the particular coffee drink of brand S, score module 220 may determine an engagement score that represents a level of engagement in a digital domain for the particular coffee drink of brand S within the common product market of coffee.

In many cases, even though a message may reference a particular brand, messages may be either positive, neutral, or negative towards the particular brand. As such, score module 220 may further determine the engagement score based on the positivity, neutrality, and negativity of the various messages.

For instance, score module 220 may determine a number of messages in the received messages that include a positive descriptor for the particular brand. Score module 220 may then determine the engagement score based on the number of messages that include the positive descriptor for the particular brand. For example, one user may construct a message that states "I don't think I am going to order this coffee drink from brand S." Another user may construct a message that states "I am absolutely in love with this coffee drink from brand S!" In such instances, score module 220 may only count the second message towards the ultimate engagement score.

In some examples, in determining the number of messages that include the positive descriptor, score module 220 may, for each message in the received messages that includes a reference to the particular brand, determine one or more words in the respective message, assign a positivity score to each of the one or more words in the respective message, determine a sum of the positivity scores for the one or more words in the respective message, compare the sum of the positivity scores to a positivity threshold score, and, responsive determining that the sum of the positivity scores is greater than the positivity threshold score, determine that the respective message includes the positive descriptor. For instance, using the messages above, the word "don't" may have a negative positivity score, and "order" may have a small, positive positivity score. However, the sum of these positivity scores may not surpass the positivity threshold score, meaning that score module 220 may disregard this message in determining the engagement score. Conversely, the phrase "absolutely in love" may have a large positivity score that surpasses the positivity threshold score, meaning that score module 220 may count this message towards the ultimate engagement score.

Similarly, score module 220 may adjust the engagement score to take into account negative sentiments towards the particular brand. In such instances, score module 220 may determine a number of messages in the received messages that include a negative descriptor for the particular brand. Score module 220 may then alter the engagement score based on the number of messages that include the negative descriptor for the particular brand. For example, one user may construct a message that states "I hate this coffee drink from brand S. It tastes like goop." As such, score module 220 may alter the engagement score based on this negative message.

In some examples, in determining the number of messages that include the negative descriptor, score module 220 may, for each message in the received messages that includes a reference to the particular brand, determine the one or more words in the respective message, assign a negativity score to each of the one or more words in the respective message, determine a sum of the negativity scores for the one or more words in the respective message, compare the sum of the negativity scores to a negativity threshold score, and, responsive to determining that the sum of the negativity scores is greater than the negativity threshold score, determine that the respective message includes the negative descriptor. For instance, using the message above, score module 220 may determine that the words "hate" and "goop" both have high negativity scores that surpass the negativity threshold score. As such, score module 220 may decrease the overall engagement score based on the negative sentiment.

In some examples, score module 220 may further take into account the popularity of the user that constructs the message when determining the engagement score. In other words, if a particular message is constructed by a celebrity who has a social media account with millions of subscribers, the message may greatly increase the engagement score. Conversely, if the particular message is constructed by a user who has a social media account with only a small number of subscribers, the message may only increase the engagement score by a small amount.

In such examples, score module 220 may determine, based on a total number of users who subscribe to at least one social media account associated with one of the one or more users of the one or more client devices, a total number of impressions for the messages. For the purposes of this disclosure, an impression is an instance where a user may see the message. For instance, if a user has a social media account with 500 subscribers, a message output by a client device associated with this social media account may have 501 impressions (one for the user themselves and one for each of the subscribers). Score module 220 may then determine a number of impressions for a group of one or more messages in the received messages that include a reference to the particular brand. Score module 220 may then determine the engagement score based on the number of impressions for the group of one or more messages that include the reference to the particular brand.

For example, score module 220 may determine that a total number of impressions for ten messages that reference the common product market is equal to 2,000,000. Score module 220 may determine that three messages reference the particular coffee drink made by brand S. Using user data 227, score module 220 may determine that a first user for the first message may have 24 subscribers. Using user data 227, score module 220 may determine that a second user for the second message may have 1,000,000 subscribers. Finally, using user data 227, score module 220 may determine that a third user for the third message may have 3,550 subscribers. As such, score module 220 may determine that the total number of impressions for the group of messages that reference the particular coffee drink made by brand S is equal to 1,003,577. Score module 220 may base the engagement score on the number of impressions that for the messages that reference the particular coffee drink made by brand S, possibly compared to the total number of impressions that reference the common product market in general.

In further examples, subscribers to the initial author of the message may share the original author's content. In such instances, the subscribers to the account that shared the original content may also be taken into account when determining the total number of impressions.

In some instances, score module 220 may only take into account messages that were sent within a particular time frame to account for recency. As such, each of the received messages may include a time stamp comprising an initial posting time for the respective message. Score module 220 may only analyze messages with a time stamp that is within a predetermined time window when determining the ultimate engagement score.

Display module 224 of computing device 120 may further output, for display at display device 126, a visual representation of the engagement score (e.g., a chart, a graph, a list, or a table). This may enable computing device 120 to display a clear and intuitive visual representation of the particular brand's engagement score and how the particular brand may compare with other brands within the same common product market. From this visual representation, a user of computing device 120 may effectively determine future marketing strategies and current marketing effectiveness, as computing device 120 provides a depiction of the particular brand's share of the market conversation with regards to the common product market.

In some examples, score module 220 may compare engagement scores across different brands. For instance, the engagement score described above may be a first engagement score, and the particular brand described above may be a first particular brand. In such instances, score module 220 may further determine, based on the received messages, a second engagement score that represents a level of engagement in a digital domain for a second particular brand within the common product market. Display module 224 may output the visual representation to be a visual comparison between the first engagement score and the second engagement score. For example, a user may want to see how a particular coffee drink of brand S compares to a similar coffee drink from brand D. In such instances, score module 220 may determine an engagement score for the similar coffee drink from brand D, and output a visual representation of a comparison between the engagement score of brand S and the engagement score of brand D, such that a user of computing device 120 may compare how the two coffee drinks match up in the eye of the public.

In some examples, market module 222 may identify competitor brand D without any specific input identifying brand D. In other words, market module 222 may identify competitors within the same common product market as, e.g., the first particular brand using various contextual information. For instance, computing device 120 may store a database containing different product markets and different brands within the respective product markets. In other instances, market module 222 may parse each of the messages received to determine trends within the received messages. For instance, if multiple messages use a certain word or phrase that could be a company name or a product name, market module 222 may identify that word or phrase as a competitor company or brand. For example, companies or brands are frequently not words in the English dictionary (or any other language's dictionary), combinations of words in the English dictionary (or any other language's dictionary), misspelled words in the English dictionary (or any other language's dictionary), words in the English dictionary (or any other language's dictionary) that do not make contextual sense if read literally in the way which they are used, acronyms, or combinations of letters that do not form actual words in the English dictionary (or any other language's dictionary). Market module 222 may parse the received messages to derive potential brands and/or competitors discussed in the received messages. If the number of messages that reference the potential brand satisfy a threshold for brand identification, market module 222 may include the potential brand in a list of potential brands for score determination. In some instances, the potential brands may be cross-referenced with other verification algorithms to ensure that the potential brand is actually, in fact, a brand within the common product market. Score module 220 may then determine engagement scores, as necessary, for the derived potential brands to enable computing device 120 to compare the engagement scores for the first particular brand with competitors' engagement scores within the same common product market.

In other examples, however, score module 220 may receive an indication of user input identifying the second particular brand for which the above comparison is made. For instance, score module 220 may receive an indication of user input that identifies brand D. In such instances, score module 220 may utilize this identification of brand D to calculate the engagement score for brand D, as described above.

As such, the user of computing device 120 may want to specifically see how many positive reactions are had for their own coffee drink compared to the positive reactions for the similar coffee drink from brand D. In such instances, score module 220 may further determine a number of messages in the received messages that include a positive descriptor for the first particular brand using the techniques described above for determining if a positive descriptor exists within a message. Score module 220 may then determine a number of messages in the received messages that include a positive descriptor for the second particular brand using the techniques described above for determining if a positive descriptor exists within a message. In such examples, score module 220 may determine the first engagement score based on the number of messages that include the positive descriptor for the first particular brand. Score module 220 may further determine the second engagement score based on the number of messages that include the positive descriptor for the second particular brand. The visual representation of the engagement scores may include a comparison between the two brands.

In some instances, a user may want to see how the engagement score changes over time. As such, score module 220 may calculate the first engagement score at a first time. At a second time later than the first time, score module 220 may receive, from the one or more client devices, a second set of messages composed by the one or more users of the one or more client devices. Each of the messages in the second set of messages may include a respective market identifier that is associated with the common product market. Score module 220 may then determine, based on the second set of messages, a second engagement score that represents a level of engagement in a digital domain for the particular brand within the common product market at the second time. Score module 220 may then determine a difference between the first engagement score and the second engagement score and output, for display at display device 126 operatively connected to computing device 120, a visual representation of the difference between the first engagement score and the second engagement score.

Figure 3:
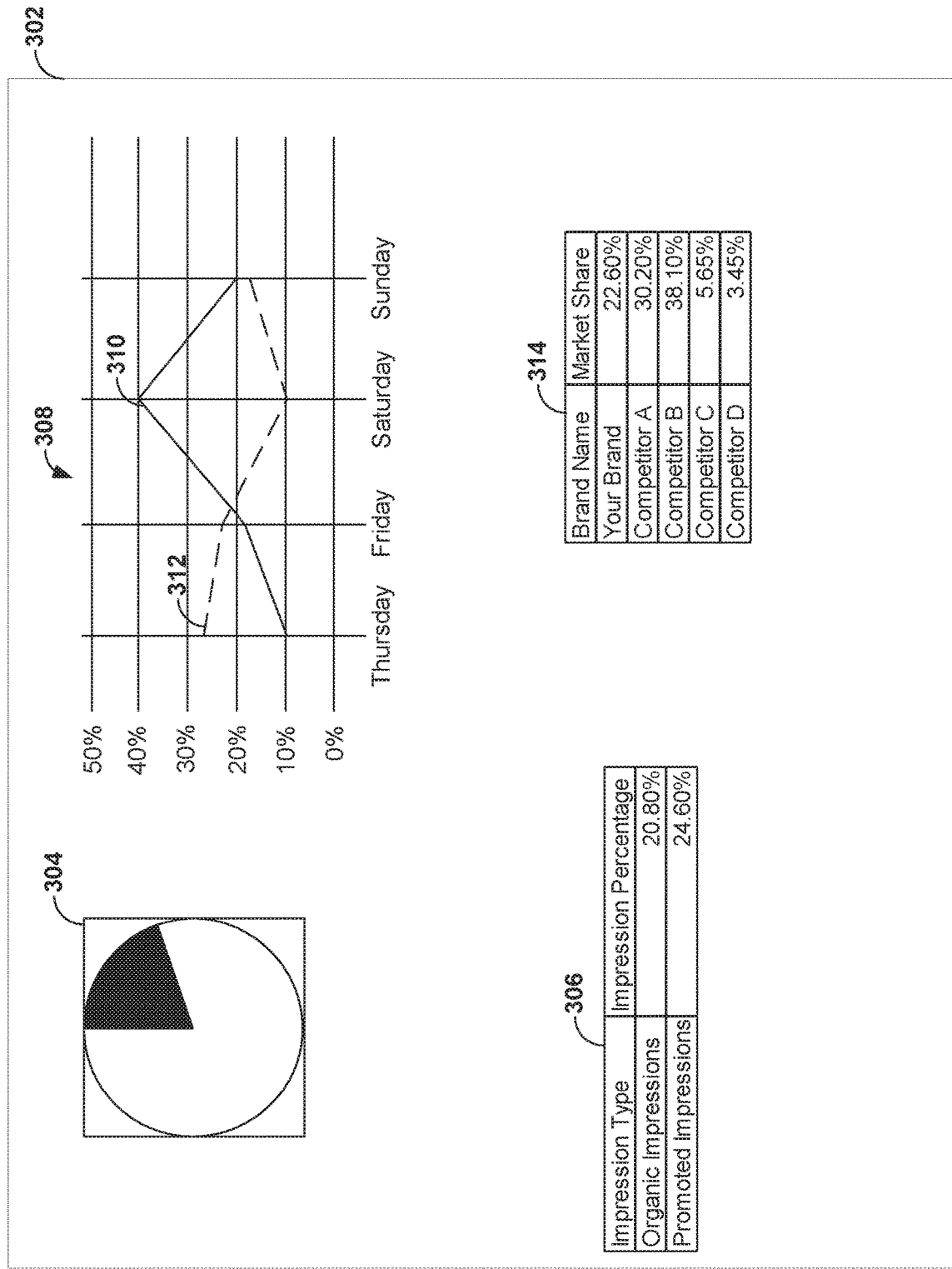
FIG. 3 is a conceptual diagram of an example visual representation that depicts detected levels of engagement in user-generated content for a particular sub-category within a common category of entities, in accordance with one or more techniques of the disclosure.

FIG. 3 is a conceptual diagram of a visual representation that depicts detected levels of engagement in user-generated content for a particular sub-category within a common category of entities, in accordance with one or more techniques of the disclosure. For purposes of illustration only, the example operations are described below within the context of information distribution system 112, client device 102A, and computing device 120, as shown in FIGS. 1 and 2.

Graphical interface 302 depicts four different examples of visual representations of the engagement score determined in accordance with the techniques of this disclosure. Visual representation 304 shows a pie chart. In visual representation 304, the black portion of the pie chart may show the percentage of all messages that reference the particular brand within the common product market, and the white portion of the pie chart may show the remainder of the messages that reference other brands within the common product market. In other examples, the visual representation (or other representations) may further show competitors brands and their respective engagement scores.

In some examples, market module 222 may identify the competitor brand without any specific input identifying the competitor brand. In other words, market module 222 may identify competitors within the same common product market as, e.g., the first particular brand using various contextual information. For instance, computing device 120 may store a database containing different product markets and different brands within the respective product markets. In other instances, market module 222 may parse each of the messages received to determine trends within the received messages. For instance, if multiple messages use a certain word or phrase that could be a company name or a product name, market module 222 may identify that word or phrase as a competitor company or brand. For example, companies or brands are frequently not words in the English dictionary (or any other language's dictionary), combinations of words in the English dictionary (or any other language's dictionary), misspelled words in the English dictionary (or any other language's dictionary), words in the English dictionary (or any other language's dictionary) that do not make contextual sense if read literally in the way which they are used, acronyms, or combinations of letters that do not form actual words in the English dictionary (or any other language's dictionary). Market module 222 may parse the received messages to derive potential brands and/or competitors discussed in the received messages. If the number of messages that reference the potential brand satisfy a threshold for brand identification, market module 222 may include the potential brand in a list of potential brands for score determination. In some instances, the potential brands may be cross-referenced with other verification algorithms to ensure that the potential brand is actually, in fact, a brand within the common product market. Score module 220 may then determine engagement scores, as necessary, for the derived potential brands to enable computing device 120 to compare the engagement scores for the first particular brand with competitors' engagement scores within the same common product market.

In other examples, however, score module 220 may receive an indication of user input identifying the second particular brand for which the above comparison is made. For instance, score module 220 may receive an indication of user input that identifies the competitor brand. In such instances, score module 220 may utilize this identification of the competitor brand to calculate the engagement score for the competitor brand, as described above.

Visual representation 306 shows a table. In the example of visual representation 306, the table shows a percentage of impressions within the common product market for organic messages (e.g., user-generated messages in which dispersal costs are not paid to the author(s)) that reference the particular brand. The table also shows a percentage of impressions within the common product market for promoted messages (e.g., messages for which the particular brand pays the author(s) to compose the messages) that reference the particular brand.

Visual representation 308 shows a line graph over time. Line 310 in visual representation 308 may show how the particular brand's engagement score changed over a four-day time period. Line 312 in visual representation 308 may show how a competitor's engagement score changed over the same four-day time period.

Visual representation 314 shows a table. In the example of visual representation 314, engagement scores equating to percentages of the market share are shown for the particular brand of the user of computing device 120, as well as the market share for four competitors to the particular brand.

Graphical interface 302 shows only four examples of visual representations that can be made in accordance with the techniques of this disclosure. Other visual representations, for example bar graphs, or combinations of how the data is shown and what data is shown in the visual representation, are contemplated in accordance with the techniques of this disclosure.

Figure 4:
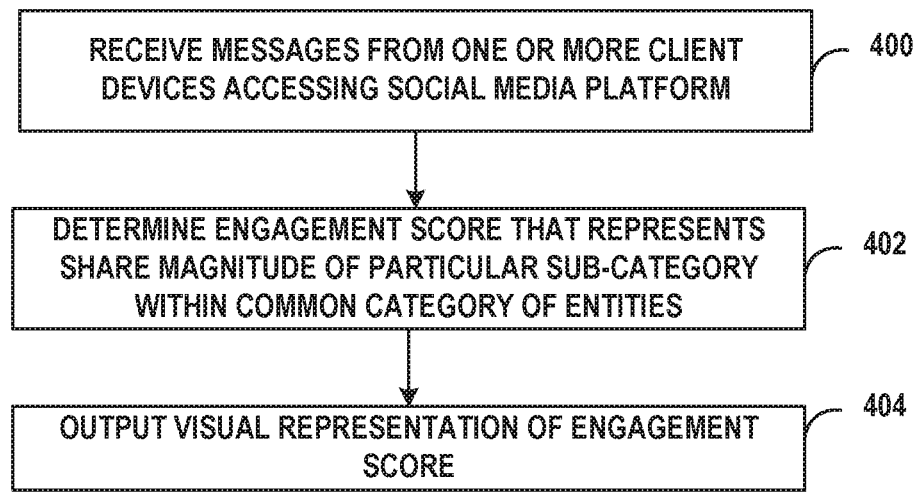
FIG. 4 is a flow diagram illustrating example operations of a computing device or system that implements techniques to detect magnitudes of trends in user-generated content and to facilitate the delivery of targeted content based on demographic data of the one or more users associated with the user-generated content, in accordance with one or more aspects of the present disclosure.

FIG. 4 is a flow diagram illustrating example operations of a computing device that implements techniques to detect magnitudes of trends in user-generated content and to facilitate the delivery of targeted content based on demographic data of the one or more users associated with the user-generated content, in accordance with one or more aspects of the present disclosure. For purposes of illustration only, the example operations are described below within the context of information distribution system 112, client device 102A, and computing device 120, as shown in FIGS. 1 and 2.

In accordance with the techniques of this disclosure, engagement module 122 may receive (400) messages from one or more client devices via an information distribution system (e.g., information distribution system 112 of FIG. 1), and store and organize the user content within computing device 120. The user content may be stored and organized using any number of datastores and data structures (e.g., graphs, lists, tables, inverted index data structures, a Relational Database Management System (RDBMS), an Object Database Management System (ODBMS), and/or an Online Analytical Processing (OLAP) system).

Each of the messages received by brand module 120 of computing device 120 may be composed by one or more users of the one or more client devices accessing a social media platform. Further, each of the messages may include a respective market identifier that is associated with a common product market. In general, the market identifier may be any one of a word, a phrase, or a hashtag indicative of the common product market. For instance, in the example of FIG. 4, the common product market may be jeans. As such, each of the messages may include a market identifier that is associated with coffee. For instance, a message may include any of the words "denim," "jeans," "pants," "shorts," a brand name of jeans, another type of jeans, a particular clothing store, or any other market identifier that one would ordinarily associate with jeans. In some examples, information distribution system 112 may only send messages to computing device 120 that include the respective market identifiers that associate the messages with the common product market. In other instances, information distribution system 112 may send a larger group of messages to computing device 120. In such instances, engagement module 122 of computing device 120 may pare down the received group of messages by disregarding any messages that do not include a market identifier that associates the message with the common product market.

Engagement module 122 of computing device 120 may determine (402) an engagement score that represents a level of engagement in a digital domain for a particular brand within the common product market based on the received messages and a machine learning model. In some examples, engagement module 122 may determine a number of messages in the received messages that include a reference to the particular brand and determine the engagement score based on the number of messages in the received messages that include the reference to the particular brand. In some instances, the engagement score may be based on the number of messages that include a reference to the particular brand. In other instances, the engagement score may be a percentage of the messages that include the reference to the particular brand relative to a total number of received messages associated with the common product market. For example, when the common product market is coffee, engagement module 122 may determine an engagement score for jeans produced by brand A. As such, engagement module 122 may determine the number of messages that include specific or learned references to the jeans by brand A. Specific references may include, for example, the words "brand A", the name of particular jeans produced by brand A, a nickname for jeans or brand A, any slogan commonly used by brand A with regards to jeans, or any other content that one would ordinarily associate with brand A and their particular jeans. However, specific references may not be necessary. For the learned references, engagement module 122 may utilize machine-learning techniques to select terms. For example, if the user-generated content commonly includes a nickname for brand A or somehow includes particular descriptors of brand A without specifically referencing brand A, engagement module 122 may include these messages in the total number of messages selected that reference brand A. Based on these messages that include the reference to jeans of brand A, engagement module 122 may determine an engagement score that represents a level of engagement in a digital domain for the jeans of brand A within the common product market of jeans.

In many cases, even though a message may reference a particular brand, messages may be either positive, neutral, or negative towards the particular brand. As such, engagement module 122 may further determine the engagement score based on the positivity, neutrality, and negativity of the various messages.

For instance, engagement module 122 may determine a number of messages in the received messages that include a positive descriptor for the particular brand. Score module may then determine the engagement score based on the number of messages that include the positive descriptor for the particular brand. For example, one user may construct a message that states "These jeans from brand A don't fit." Another user may construct a message that states "I am going to wear the jeans from brand A every day!" In such instances, engagement module 122 may only count the second message towards the ultimate engagement score.

In some examples, in determining the number of messages that include the positive descriptor, engagement module 122 may, for each message in the received messages that includes a reference to the particular brand, determine one or more words in the respective message, assign a positivity score to each of the one or more words in the respective message, determine a sum of the positivity scores for the one or more words in the respective message, compare the sum of the positivity scores to a positivity threshold score, and, responsive determining that the sum of the positivity scores is greater than the positivity threshold score, determine that the respective message includes the positive descriptor. For instance, using the messages above, the phrase "don't fit" may have a negative positivity score. As such, the positivity score may not surpass the positivity threshold score, meaning that engagement module 122 may disregard this message in determining the engagement score. Conversely, the phrase "going to wear" and "everyday" with an exclamation point may sum to have a large positivity score that surpasses the positivity threshold score, meaning that engagement module 122 may count this message towards the ultimate engagement score.

Similarly, engagement module 122 may adjust the engagement score to take into account negative sentiments towards the particular brand. In such instances, engagement module 122 may determine a number of messages in the received messages that include a negative descriptor for the particular brand. Engagement module 122 may then alter the engagement score based on the number of messages that include the negative descriptor for the particular brand. For example, one user may construct a message that states "I hate these jeans from brand A. They feel like steel wool."

In some examples, in determining the number of messages that include the negative descriptor, engagement module 122 may, for each message in the received messages that includes a reference to the particular brand, determine the one or more words in the respective message, assign a negativity score to each of the one or more words in the respective message, determine a sum of the negativity scores for the one or more words in the respective message, compare the sum of the negativity scores to a negativity threshold score, and, responsive determining that the sum of the negativity scores is greater than the negativity threshold score, determine that the respective message includes the negative descriptor. For instance, using the message above, engagement module 122 may determine that the words "hate" and "steel wool" both have high negativity scores that surpass the negativity threshold score. As such, engagement module 122 may decrease the overall engagement score based on the negative sentiment.

In some examples, engagement module 122 may further take into account the popularity of the user that constructs the message when determining the engagement score. In other words, if a particular message is constructed by a celebrity who has a social media account with millions of subscribers, the message may greatly increase the engagement score. Conversely, if the particular message is constructed by a user who has a social media account with only a small number of subscribers, the message may only increase the engagement score by a small amount.

In such examples, engagement module 122 may determine, based on a total number of users who subscribe to at least one social media account associated with one of the one or more users of the one or more client devices, a total number of impressions for the messages. For the purposes of this disclosure, an impression is an instance where a user may see the message. For instance, if a user has a social media account with 500 subscribers, a message output by a client device associated with this social media account may have 501 impressions (one for the user themselves and one for each of the subscribers). Engagement module 122 may then determine a number of impressions for a group of one or more messages in the received messages that include a reference to the particular brand. Engagement module 122 may then determine the engagement score based on the number of impressions for the group of one or more messages that include the reference to the particular brand.

For example, engagement module 122 may determine that a total number of impressions for ten messages that reference the common product market is equal to 2,000,000. Engagement module 122 may determine that three messages reference the particular coffee drink made by brand A. Using user data 227, engagement module 122 may determine that a first user for the first message may have 24 subscribers. Using user data 227, engagement module 122 may determine that a second user for the second message may have 1,000,000 subscribers. Finally, using user data 227, engagement module 122 may determine that a third user for the third message may have 3,550 subscribers. As such, engagement module 122 may determine that the total number of impressions for the group of messages that reference the particular coffee drink made by brand A is equal to 1,003, 577. Engagement module 122 may base the engagement score on the number of impressions that for the messages that reference the particular coffee drink made by brand A, possibly compared to the total number of impressions that reference the common product market in general.

In further examples, subscribers to the initial author of the message may share the original author's content. In such instances, the subscribers to the account that shared the original content may also be taken into account when determining the total number of impressions.

In some instances, engagement module 122 may only take into account messages that were sent within a particular time frame to account for recency. As such, each of the received messages may include a time stamp comprising an initial posting time for the respective message. Engagement module 122 may only analyze messages with a time stamp that is within a predetermined time window when determining the ultimate engagement score.

Engagement module 122 of computing device 120 may further output (404), for display at display device 126, a visual representation of the engagement score, for example a chart, a graph, a list, or a table, to name only a few examples. This may enable computing device 120 to display a clear and intuitive visual representation of the particular brand's engagement score and how the particular brand may compare with other brands within the same common product market. From this visual representation, a user of computing device 120 may effectively determine future marketing strategies and current marketing effectiveness, as computing device 120 provides a depiction of the particular brand's share of the market conversation with regards to the common product market.

In some examples, engagement module 122 may compare engagement scores across engagement scores. For instance, the engagement score described above may be a first engagement score, and the particular brand described above may be a first particular brand. In such instances, engagement module 122 may further determine, based on the received messages, a second engagement score that represents a level of engagement in a digital domain for a second particular brand within the common product market. Engagement module 122 may output the visual representation to be a visual comparison between the first engagement score and the second engagement score. For example, brand A may want to see how their jeans compare to similar jeans from brand L. In such instances, engagement module 122 may determine an engagement score for the similar jeans from brand L such that a user of computing device 120 may compare how the two jeans match up in the eye of the public.

In some examples, engagement module 122 may identify competitor brand D without any specific input identifying brand L. In other words, engagement module 122 may identify competitors within the same common product market as, e.g., the first particular brand using various contextual information. For instance, computing device 120 may store a database containing different product markets and different brands within the respective product markets. In other instances, engagement module 122 may parse each of the messages received to determine trends within the received messages. For instance, if multiple messages use a certain word or phrase that could be a company name or a product name, engagement module 122 may identify that word or phrase as a competitor. For example, companies or brands are frequently not words in the English dictionary (or any other language's dictionary), combinations of words in the English dictionary (or any other language's dictionary), misspelled words in the English dictionary (or any other language's dictionary), words in the English dictionary (or any other language's dictionary) that do not make contextual sense if read literally in the way which they are used, acronyms, or combinations of letters that do not form actual words in the English dictionary (or any other language's dictionary). Engagement module 122 may parse the received messages to derive potential brands and competitors discussed in the received messages. If the number of messages that reference the potential brand satisfy a threshold for brand identification, engagement module 122 may include the potential brand in a list of potential brands for score determination. In some instances, the potential brands may be cross-referenced with other verification algorithms to ensure that the potential brand is actually, in fact, a brand within the common product market. Engagement module 122 may then determine engagement scores, as necessary, for the derived potential brands to enable computing device 120 to compare the engagement scores for the first particular brand with competitors' engagement scores within the same common product market.

In other examples, however, engagement module 122 may receive an indication of user input identifying the second particular brand for which the above comparison is made. For instance, engagement module 122 may receive an indication of user input that identifies brand L. In such instances, engagement module 122 may utilize this identification of brand L to calculate the engagement score for brand L, as described above.

As such, the user of computing device 120 may want to specifically see how many positive reactions are had for their own jeans compared to the positive reactions for the similar jeans from brand L. In such instances, engagement module 122 may further determine a number of messages in the received messages that include a positive descriptor for the first particular brand using the techniques described above for determining if a positive descriptor exists within a message. Engagement module 122 may then determine a number of messages in the received messages that include a positive descriptor for the second particular brand using the techniques described above for determining if a positive descriptor exists within a message. In such examples, engagement module 122 may determine the first engagement score based on the number of messages that include the positive descriptor for the first particular brand. Engagement module 122 may further determine the second engagement score based on the number of messages that include the positive descriptor for the second particular brand. The visual representation of the engagement scores may include a comparison between the two brands.

In some instances, a user may want to see how the engagement score changes over time. As such, engagement module 122 may calculate the first engagement score at a first time. At a second time later than the first time, engagement module 122 may receive, from the one or more client devices, a second set of messages composed by the one or more users of the one or more client devices. Each of the messages in the second set of messages may include a respective market identifier that is associated with the common product market. Engagement module 122 may then determine, based on the second set of messages, a second engagement score that represents a level of engagement in a digital domain for the particular brand within the common product market at the second time. Engagement module 122 may then determine a difference between the first engagement score and the second engagement score and output, for display at display device 126 operatively connected to computing device 120, a visual representation of the difference between the first engagement score and the second engagement score.

Example 1

A method comprising: receiving, by a computing system that includes one or more processors and from one or more client devices accessing a social media platform, messages composed by one or more users of the one or more client devices, wherein each of the messages includes a respective market identifier, and wherein each respective market identifier is associated with a common category of entities; determining, by the computing system and based on the messages and a machine learning model, an engagement score that represents a level of engagement in a digital domain for a particular sub-category within the common category of entities; and outputting, by the computing system and for display at a display device operatively connected to the computing system, a visual representation of the engagement score. In some instances of example 1, the common category of entities comprises a common product market, the particular sub-category comprises the particular brand, and the identifier comprises a market identifier.

Example 2

The method of example 1, wherein determining the engagement score comprises: determining, by the computing system, a number of messages in the received messages that each include a reference to the particular brand; and determining, by the computing system, the engagement score based on the number of messages that include the reference to the particular brand.

Example 3

The method of example 2, wherein the reference to the particular brand comprises a word, a phrase, or a hashtag indicative of the particular brand.

Example 4

The method of any of examples 2-3, wherein the engagement score comprises one of: the number of messages that include the reference to the particular brand, or a percentage of the messages that include the reference to the particular brand relative to a total number of received messages.

Example 5

The method of any of examples 1-4, wherein determining the engagement score comprises: determining, by the computing system, a number of messages in the received messages that include a positive descriptor for the particular brand; and determining, by the computing system, the engagement score based on the number of messages that include the positive descriptor for the particular brand, wherein determining the number of messages that include the positive descriptor comprises, for each message in the received messages that includes a reference to the particular brand: determining, by the computing system, one or more words in the respective message; assigning, by the computing system, a positivity score to each of the one or more words in the respective message; determining, by the computing system, a sum of the positivity scores for the one or more words in the respective message; comparing, by the computing system, the sum of the positivity scores to a positivity threshold score; and responsive determining that the sum of the positivity scores is greater than the positivity threshold score, determining, by the computing system, that the respective message includes the positive descriptor.

Example 6

The method of example 5, further comprising: determining, by the computing system, a number of messages in the received messages that include a negative descriptor for the particular brand; and altering, by the computing system, the engagement score based on the number of messages that include the negative descriptor for the particular brand, wherein determining the number of messages that include the negative descriptor comprises, for each message in the received messages that includes a reference to the particular brand: determining, by the computing system, the one or more words in the respective message; assigning, by the computing system, a negativity score to each of the one or more words in the respective message; determining, by the computing system, a sum of the negativity scores for the one or more words in the respective message; comparing, by the computing system, the sum of the negativity scores to a negativity threshold score; and responsive determining that the sum of the negativity scores is greater than the negativity threshold score, determining, by the computing system, that the respective message includes the negative descriptor.

Example 7

The method of any of examples 1-6, wherein the engagement score is a first engagement score, wherein the particular brand is a first particular brand, and wherein the method further comprises: determining, by the computing system and based on the messages, a second engagement score that represents a second level of engagement in the digital domain for a second particular brand within the common product market, wherein the visual representation comprises a visual comparison between the first engagement score and the second engagement score.

Example 8

The method of example 7, further comprising: determining, by the computing system, a number of messages in the received messages that include a positive descriptor for the first particular brand; and determining, by the computing system, a number of messages in the received messages that include a positive descriptor for the second particular brand, wherein the first engagement score is based on the number of messages that include the positive descriptor for the first particular brand, and wherein the second engagement score is based on the number of messages that include the positive descriptor for the second particular brand, wherein determining the number of messages that include the positive descriptor for the first particular brand comprises, for each message in the received messages that includes a reference to the first particular brand: determining, by the computing system, one or more words in the respective message; assigning, by the computing system, a positivity score to each of the one or more words in the respective message; determining, by the computing system, a sum of the positivity scores for the one or more words in the respective message; comparing, by the computing system, the sum of the positivity scores to a positivity threshold score; and responsive determining that the sum of the positivity scores is greater than the positivity threshold score, determining, by the computing system, that the respective message includes the positive descriptor.

Example 9

The method of any of examples 7-8, further comprising: identifying, by the computing system, the second particular brand based on content contained within the received messages.

Example 10

The method of any of examples 1-9, wherein each market identifier comprises one of a word, a phrase, or a hashtag indicative of the common product market.

Example 11

The method of any of examples 1-10, further comprising: determining, by the computing system and based on a total number of users who subscribe to at least one social media account associated with one of the one or more users of the one or more client devices, a total number of impressions for the messages; and determining, by the computing system, a number of impressions for a group of one or more messages in the received messages that include a reference to the particular brand; and determining, by the computing system, the engagement score based on the number of impressions for the group of one or more messages that include the reference to the particular brand.

Example 12

The method of example 11, wherein the engagement score comprises one of: the number of impressions for the group of one or more messages that include the reference to the particular brand, or a percentage of the impressions for the group of one or more messages that include the reference to the particular brand relative to the total number of impressions for the messages.

Example 13

The method of any of examples 1-12, wherein the visual representation comprises one of a chart, a graph, a list, or a table.

Example 14

The method of any of examples 1-13, wherein each of the received messages include a time stamp comprising an initial posting time for the respective message, and wherein each respective time stamp for each respective received message is within a predetermined time window.

Example 15

The method of any of examples 1-14, wherein the engagement score comprises a first engagement score measured at a first time, and wherein the method further comprises: receiving, by the computing system and from the one or more client devices, a second set of messages composed by the one or more users of the one or more client devices, wherein each of the messages in the second set of messages includes a respective market identifier that is associated with the common product market; determining, by the computing system at a second time after the first time and based on the second set of messages, a second engagement score that represents a second level of engagement in the digital domain for the particular brand within the common product market; determining, by the computing system, a difference between the first engagement score and the second engagement score; and outputting, by the computing system and for display at the display device operatively connected to the computing system, a visual representation of the difference between the first engagement score and the second engagement score.

Example 15.1

The method of any of examples 1-15, further comprising: updating, by the computing system, the machine learning model based on one or more of updates to a common product market dictionary of market identifiers, one or more updates to a particular brand dictionary, one or more indications of a false positive for the set of messages, or one or more indications of a false negative for a message not included in the set of messages.

Example 16

A non-transitory computer-readable storage medium storing instructions that, when executed, cause at least one processor of a computing system to: receive, from one or more client devices accessing a social media platform, messages composed by one or more users of the one or more client devices, wherein each of the messages includes a respective market identifier, and wherein each respective market identifier is associated with a common category of entities; determine, based on the messages and a machine learning model, an engagement score that represents a level of engagement in a digital domain for a particular sub-category within the common category of entities; and output, for display at a display device operatively connected to the computing system, a visual representation of the engagement score. In some instances of example 16, the common category of entities comprises a common product market, the particular sub-category comprises a particular brand, and the identifier comprises a market identifier.

Example 17

The non-transitory computer-readable storage medium of example 16, wherein the instructions that cause the at least one processor to determine the engagement score comprise instructions that, when executed, cause the at least one processor to: determine a number of messages in the received messages that each include a reference to the particular brand; and determine the engagement score based on the number of messages that include the reference to the particular brand, wherein the reference to the particular brand comprises a word, a phrase, or a hashtag indicative of the particular brand, and wherein the engagement score comprises one of: the number of messages that include the reference to the particular brand, or a percentage of the messages that include the reference to the particular brand relative to a total number of received messages.

Example 18

The non-transitory computer-readable storage medium of any of examples 16-17, wherein the instructions that cause the at least one processor to determine the engagement score comprise instructions that, when executed, cause the at least one processor to: determine a number of messages in the received messages that include a positive descriptor for the particular brand; and determine the engagement score based on the number of messages that include the positive descriptor for the particular brand, wherein the instructions that cause the at least one processor to determine the number of messages that include the positive descriptor comprise instructions that, when executed, cause the at least one processor to, for each message in the received messages that includes a reference to the particular brand: determine one or more words in the respective message; assign a positivity score to each of the one or more words in the respective message; determine a sum of the positivity scores for the one or more words in the respective message; compare the sum of the positivity scores to a positivity threshold score; and responsive determining that the sum of the positivity scores is greater than the positivity threshold score, determine that the respective message includes the positive descriptor.

Example 19

The non-transitory computer-readable storage medium of example 18, wherein the instructions, when executed, further cause the at least one processor to: determine a number of messages in the received messages that include a negative descriptor for the particular brand; and alter the engagement score based on the number of messages that include the negative descriptor for the particular brand, wherein the instructions that cause the at least one processor to determine the number of messages that include the negative descriptor comprise instructions that, when executed, cause the at least one processor to, for each message in the received messages that includes a reference to the particular brand: determine the one or more words in the respective message; assign a negativity score to each of the one or more words in the respective message; determine a sum of the negativity scores for the one or more words in the respective message; compare the sum of the negativity scores to a negativity threshold score; and responsive determining that the sum of the negativity scores is greater than the negativity threshold score, determine that the respective message includes the negative descriptor.

Example 20

The non-transitory computer-readable storage medium of any of examples 16-19, wherein the engagement score is a first engagement score, wherein the particular brand is a first particular brand, and wherein the instructions, when executed, further cause the at least one processor to: determine, based on the messages, a second engagement score that represents a second level of engagement in the digital domain for a second particular brand within the common product market, wherein the visual representation comprises a visual comparison between the first engagement score and the second engagement score.

Example 21

The non-transitory computer-readable storage medium of example 20, wherein the instructions, when executed, further cause the at least one processor to: determine a number of messages in the received messages that include a positive descriptor for the first particular brand; and determine a number of messages in the received messages that include a positive descriptor for the second particular brand, wherein the first engagement score is based on the number of messages that include the positive descriptor for the first particular brand, and wherein the second engagement score is based on the number of messages that include the positive descriptor for the second particular brand, wherein the instructions that cause the at least one processor to determine the number of messages that include the positive descriptor for the first particular brand comprise instructions that, when executed, cause the at least one processor to, for each message in the received messages that includes a reference to the first particular brand: determine one or more words in the respective message; assign a positivity score to each of the one or more words in the respective message; determine a sum of the positivity scores for the one or more words in the respective message; compare the sum of the positivity scores to a positivity threshold score; and responsive determining that the sum of the positivity scores is greater than the positivity threshold score, determine that the respective message includes the positive descriptor.

Example 22

The non-transitory computer-readable storage medium of any of examples 16-21, wherein the instructions, when executed, further cause the at least one processor to: determine, based on a total number of users who subscribe to at least one social media account associated with one of the one or more users of the one or more client devices, a total number of impressions for the messages; and determine a number of impressions for a group of one or more messages in the received messages that include a reference to the particular brand; and determine the engagement score based on the number of impressions for the group of one or more messages that include the reference to the particular brand, wherein the engagement score comprises one of: the number of impressions for the group of one or more messages that include the reference to the particular brand, or a percentage of the impressions for the group of one or more messages that include the reference to the particular brand relative to the total number of impressions for the messages.

Example 23

The non-transitory computer-readable storage medium of any of examples 16-22, wherein the visual representation comprises one of a chart, a graph, a list, or a table.

Example 24

The non-transitory computer-readable storage medium of any of examples 16-23, wherein each of the received messages include a time stamp comprising an initial posting time for the respective message, and wherein each respective time stamp for each respective received message is within a predetermined time window.

Example 25

The non-transitory computer-readable storage medium of any of examples 16-24, wherein the engagement score comprises a first engagement score measured at a first time, and wherein the instructions, when executed, further cause the at least one processor to: receive, from the one or more client devices, a second set of messages composed by the one or more users of the one or more client devices, wherein each of the messages in the second set of messages includes a respective market identifier that is associated with the common product market; determine, at a second time after the first time and based on the second set of messages, a second engagement score that represents a second level of engagement in the digital domain for the particular brand within the common product market; determine a difference between the first engagement score and the second engagement score; and output, for display at the display device operatively connected to the computing system, a visual representation of the difference between the first engagement score and the second engagement score.

Example 26

A computing system comprising: at least one processor; and at least one non-transitory computer-readable storage medium storing instructions that are executable by the at least one processor to: receive, from one or more client devices, messages composed by one or more users of the one or more client devices accessing a social media platform, wherein each of the messages includes a respective market identifier, and wherein each respective market identifier is associated with a common category of entities; determine, based on the messages and a machine learning model, an engagement score that represents a level of engagement in a digital domain for a particular sub-category within the common category of entities; and output, for display at a display device operatively connected to the computing system, a visual representation of the engagement score. In some instances of example 26, the common category of entities comprises a common product market, the particular sub-category comprises a particular brand, and the identifier comprises a market identifier.

Example 27

The computing system of example 26, wherein the instructions are further executable by the at least one processor to: determine a number of messages in the received messages that each include a reference to the particular brand; and determine the engagement score based on the number of messages that include the reference to the particular brand, wherein the reference to the particular brand comprises a word, a phrase, or a hashtag indicative of the particular brand, wherein the engagement score comprises one of: the number of messages that include the reference to the particular brand, or a percentage of the messages that include the reference to the particular brand relative to a total number of received messages.

Example 28

The computing system of any of examples 26-27, wherein the instructions are further executable by the at least one processor to: determine a number of messages in the received messages that include a positive descriptor for the particular brand; and determine the engagement score based on the number of messages that include the positive descriptor for the particular brand, wherein the instructions that are executable by the at least one processor to determine the number of messages that include the positive descriptor comprise instructions that are executable by the at least one processor to, for each message in the received messages that includes a reference to the particular brand: determine one or more words in the respective message; assign a positivity score to each of the one or more words in the respective message; determine a sum of the positivity scores for the one or more words in the respective message; compare the sum of the positivity scores to a positivity threshold score; and responsive determining that the sum of the positivity scores is greater than the positivity threshold score, determine that the respective message includes the positive descriptor.

Example 29

The computing system of any of examples 26-28, wherein the engagement score is a first engagement score, wherein the particular brand is a first particular brand, and wherein the instructions are further executable by the at least one processor to: determine, based on the messages, a second engagement score that represents a second level of engagement in the digital domain for a second particular brand within the common product market, wherein the visual representation comprises a visual comparison between the first engagement score and the second engagement score.

Example 30

The computing system of any of examples 26-29, wherein the instructions are further executable by the at least one processor to: determine, based on a total number of users who subscribe to at least one social media account associated with one of the one or more users of the one or more client devices, a total number of impressions for the messages; and determine a number of impressions for a group of one or more messages in the received messages that include a reference to the particular brand; and determine the engagement score based on the number of impressions for the group of one or more messages that include the reference to the particular brand.

Example 31

A device comprising means for performing the method of any of examples 1-15.1.

Example 32

A non-transitory computer-readable storage medium storing instructions that, when executed, cause at least one processor to perform the method of any of examples 1-15.1.

Example 33

A device comprising at least one module operable by one or more processors to perform the method of any of examples 1-15.1.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium, for example, data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium, for example, a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies, for example, infrared, radio, and microwave, then the coaxial cable, fiber optic cable, twisted pair, DSL, or wireless technologies, for example, infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, for example, one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium includes a non-transitory medium. In some examples, the term "non-transitory" indicates that the storage medium is not embodied in a carrier wave or a propagated signal. In certain examples, a non-transitory storage medium may store data that can, over time, change (e.g., in RAM or cache). Although certain examples are described as outputting various information for display, techniques of the disclosure may output such information in other forms, for example, audio, holographical, or haptic forms, to name only a few examples, in accordance with techniques of the disclosure.

Various examples of the disclosure have been described. Any combination of the described systems, operations, or functions is contemplated. These and other examples are within the scope of the following claims.

The invention claimed is:
1. A computing system comprising:
at least one processor; and

37 at least one non-transitory computer-readable storage medium storing instructions that are executable by the at least one processor to:
receive, from one or more client devices, messages composed by one or more users of the one or more client devices accessing a social media platform, wherein each of the messages includes a respective identifier, and wherein each respective identifier is associated with a common category of entities;
determine, based on the messages and a machine learning model, an engagement score that represents a level of engagement in a digital domain for a particular sub-category within the common category of entities; and
output, for display at a display device operatively connected to the computing system, a visual representation of the engagement score,
wherein the instructions are further executable by the at least one processor to:
determine a number of messages in the received messages that include a positive descriptor for the particular sub-category; and
determine the engagement score based on the number of messages that include the positive descriptor for the particular sub-category,
wherein the instructions that are executable by the at least one processor to determine the number of messages that include the positive descriptor comprise instructions that are executable by the at least one processor to, for each message in the received messages that includes a reference to the particular sub-category:
determine one or more words in the respective message;
assign a positivity score to each of the one or more words in the respective message;
determine a sum of the positivity scores for the one or more words in the respective message;
compare the sum of the positivity scores to a positivity threshold score; and
responsive determining that the sum of the positivity scores is greater than the positivity threshold score, determine that the respective message includes the positive descriptor.

2. The computing system of claim 1, wherein the visual representation comprises one of a chart, a graph, a list, or a table.

3. The computing system of claim 1, wherein each of the received messages include a time stamp comprising an initial posting time for the respective message, and wherein each respective time stamp for each respective received message is within a predetermined time window.

4. A computing system comprising:
at least one processor; and
at least one non-transitory computer-readable storage medium storing instructions that are executable by the at least one processor to:
receive, from one or more client devices, messages composed by one or more users of the one or more client devices accessing a social media platform, wherein each of the messages includes a respective identifier, and wherein each respective identifier is associated with a common category of entities;
determine, based on the messages and a machine learning model, an engagement score that represents a level of engagement in a digital domain for a particular sub-category within the common category of entities; and

38 output, for display at a display device operatively connected to the computing system, a visual representation of the engagement score,
wherein the instructions are further executable by the at least one processor to:
determine, based on a total number of users who subscribe to at least one social media account associated with one of the one or more users of the one or more client devices, a total number of impressions for the messages; and
determine a number of impressions for a group of one or more messages in the received messages that include a reference to the particular sub-category; and
determine the engagement score based on the number of impressions for the group of one or more messages that include the reference to the particular sub-category.

5. The computing system of claim 4, wherein the reference to the particular sub-category comprises a word, a phrase, or a hashtag indicative of the particular sub-category.

6. The computing system of claim 4, wherein the visual representation comprises one of a chart, a graph, a list, or a table.

7. A method comprising:
receiving, by a computing system that includes one or more processors, and from one or more client devices accessing a social media platform, messages composed by one or more users of the one or more client devices, wherein each of the messages includes a respective identifier, and wherein each respective identifier is associated with a common category of entities;
determining, by the computing system and based on the messages and a machine learning model, an engagement score that represents a level of engagement in a digital domain for a particular sub-category within the common category of entities; and
outputting, by the computing system and for display at a display device operatively connected to the computing system, a visual representation of the engagement score,
wherein determining the engagement score comprises:
determining, by the computing system, a number of messages in the received messages that include a positive descriptor for the particular sub-category; and
determining, by the computing system, the engagement score based on the number of messages that include the positive descriptor for the particular sub-category,
wherein determining the number of messages that include the positive descriptor comprises, for each message in the received messages that includes the reference to the particular sub-category:
determining, by the computing system, one or more words in the respective message;
assigning, by the computing system, a positivity score to each of the one or more words in the respective message;
determining, by the computing system, a sum of the positivity scores for the one or more words in the respective message;
comparing, by the computing system, the sum of the positivity scores to a positivity threshold score; and
responsive determining that the sum of the positivity scores is greater than the positivity threshold score, determining, by the computing system, that the respective message includes the positive descriptor.

8. The method of claim 7, further comprising:
determining, by the computing system, a number of messages in the received messages that include a negative descriptor for the particular sub-category; and
altering, by the computing system, the engagement score based on the number of messages that include the negative descriptor for the particular sub-category,
wherein determining the number of messages that include the negative descriptor comprises, for each message in the received messages that includes the reference to the particular sub-category:
determining, by the computing system, the one or more words in the respective message;
assigning, by the computing system, a negativity score to each of the one or more words in the respective message;
determining, by the computing system, a sum of the negativity scores for the one or more words in the respective message;
comparing, by the computing system, the sum of the negativity scores to a negativity threshold score; and
responsive determining that the sum of the negativity scores is greater than the negativity threshold score, determining, by the computing system, that the respective message includes the negative descriptor.

9. A method comprising:
receiving, by a computing system that includes one or more processors, and from one or more client devices accessing a social media platform, messages composed by one or more users of the one or more client devices, wherein each of the messages includes a respective identifier, and wherein each respective identifier is associated with a common category of entities;
determining, by the computing system and based on the messages and a machine learning model, an engagement score that represents a level of engagement in a digital domain for a particular sub-category within the common category of entities; and
outputting, by the computing system and for display at a display device operatively connected to the computing system, a visual representation of the engagement score,
the method further comprising:
determining, by the computing system and based on a total number of users who subscribe to at least one social media account associated with one of the one or more users of the one or more client devices, a total number of impressions for the messages; and
determining, by the computing system, a number of impressions for a group of one or more messages in the received messages that include a reference to the particular sub-category; and
determining, by the computing system, the engagement score based on the number of impressions for the group of one or more messages that include the reference to the particular sub-category.

10. The method of claim 9, wherein the engagement score comprises one of:
the number of impressions for the group of one or more messages that include the reference to the particular sub-category, or
a percentage of the impressions for the group of one or more messages that include the reference to the particular sub-category relative to the total number of impressions for the messages.

11. A method comprising:
receiving, by a computing system that includes one or more processors, and from one or more client devices accessing a social media platform, messages composed by one or more users of the one or more client devices, wherein each of the messages includes a respective identifier, and wherein each respective identifier is associated with a common category of entities;
determining, by the computing system and based on the messages and a machine learning model, an engagement score that represents a level of engagement in a digital domain for a particular sub-category within the common category of entities; and
outputting, by the computing system and for display at a display device operatively connected to the computing system, a visual representation of the engagement score,
wherein the engagement score comprises a first engagement score measured at a first time, and wherein the method further comprises:
receiving, by the computing system and from the one or more client devices, a second set of messages composed by the one or more users of the one or more client devices, wherein each of the messages in the second set of messages includes a respective identifier that is associated with the common category of entities;
determining, by the computing system at a second time after the first time and based on the second set of messages, a second engagement score that represents a second level of engagement in the digital domain for the particular sub-category within the common category of entities;
determining, by the computing system, a difference between the first engagement score and the second engagement score; and
outputting, by the computing system and for display at the display device operatively connected to the computing system, a visual representation of the difference between the first engagement score and the second engagement score.

12. The method of claim 11, further comprising:
determining a number of messages in the received messages that include a positive or a negative descriptor for the particular sub-category; and
determining the first engagement score based on the number of messages that include the positive descriptor or the negative descriptor for the particular sub-category.

13. The method of claim 11, wherein the first engagement score comprises one of:
the number of messages that include the reference to the particular sub-category, or
a percentage of the messages that include the reference to the particular sub-category relative to a total number of received messages.

14. The method of claim 11, wherein each identifier comprises one of a word, a phrase, or a hashtag indicative of the common category of entities.

15. The method of claim 11, wherein the first engagement score comprises one of:
the number of impressions for the group of one or more messages that include the reference to the particular sub-category, or
a percentage of the impressions for the group of one or more messages that include the reference to the particular sub-category relative to the total number of impressions for the messages.

16. A non-transitory computer-readable storage medium storing instructions that, when executed, cause at least one processor of a computing system to:
receive, from one or more client devices, messages composed by one or more users of the one or more client devices accessing a social media platform, wherein each of the messages includes a respective identifier, and wherein each respective identifier is associated with a common category of entities;
determine, based on the messages and a machine learning model, an engagement score that represents a level of engagement in a digital domain for a particular sub-category within the common category of entities; and
output, for display at a display device operatively connected to the computing system, a visual representation of the engagement score,
wherein the instructions that cause the at least one processor to determine the engagement score comprise instructions that, when executed, cause the at least one processor to:
determine a number of messages in the received messages that include a positive descriptor for the particular sub-category; and
determine the engagement score based on the number of messages that include the positive descriptor for the particular sub-category,
wherein the instructions that cause the at least one processor to determine the number of messages that include the positive descriptor comprise instructions that, when executed, cause the at least one processor to, for each message in the received messages that includes a reference to the particular sub-category:
determine one or more words in the respective message;
assign a positivity score to each of the one or more words in the respective message;
determine a sum of the positivity scores for the one or more words in the respective message;
compare the sum of the positivity scores to a positivity threshold score; and
responsive determining that the sum of the positivity scores is greater than the positivity threshold score, determine that the respective message includes the positive descriptor.

17. The non-transitory computer-readable storage medium of claim 16, wherein the instructions, when executed, further cause the at least one processor to:
determine a number of messages in the received messages that include a negative descriptor for the particular sub-category; and
alter the engagement score based on the number of messages that include the negative descriptor for the particular sub-category,
wherein the instructions that cause the at least one processor to determine the number of messages that include the negative descriptor comprise instructions that, when executed, cause the at least one processor to, for each message in the received messages that includes a reference to the particular sub-category:
determine the one or more words in the respective message;
assign a negativity score to each of the one or more words in the respective message;
determine a sum of the negativity scores for the one or more words in the respective message;
compare the sum of the negativity scores to a negativity threshold score; and
responsive determining that the sum of the negativity scores is greater than the negativity threshold score, determine that the respective message includes the negative descriptor.

18. A non-transitory computer-readable storage medium storing instructions that, when executed, cause at least one processor of a computing system to:
receive, from one or more client devices, messages composed by one or more users of the one or more client devices accessing a social media platform, wherein each of the messages includes a respective identifier, and wherein each respective identifier is associated with a common category of entities;
determine, based on the messages and a machine learning model, an engagement score that represents a level of engagement in a digital domain for a particular sub-category within the common category of entities; and
output, for display at a display device operatively connected to the computing system, a visual representation of the engagement score,
wherein the engagement score is a first engagement score, wherein the particular sub-category is a first particular sub-category, and wherein the instructions, when executed, further cause the at least one processor to:
determine, based on the messages, a second engagement score that represents a level of engagement in the digital domain for a second particular sub-category within the common category of entities,
wherein the visual representation comprises a visual comparison between the first engagement score and the second engagement score,
wherein the instructions, when executed, further cause the at least one processor to:
determine a number of messages in the received messages that include a positive descriptor for the first particular sub-category; and
determine a number of messages in the received messages that include a positive descriptor for the second particular sub-category,
wherein the first engagement score is based on the number of messages that include the positive descriptor for the first particular sub-category, and
wherein the second engagement score is based on the number of messages that include the positive descriptor for the second particular sub-category,
wherein the instructions that cause the at least one processor to determine the number of messages that include the positive descriptor for the first particular sub-category comprise instructions that, when executed, cause the at least one processor to, for each message in the received messages that includes a reference to the first particular sub-category:
determine one or more words in the respective message;
assign a positivity score to each of the one or more words in the respective message;
determine a sum of the positivity scores for the one or more words in the respective message;
compare the sum of the positivity scores to a positivity threshold score; and
responsive determining that the sum of the positivity scores is greater than the positivity threshold score, determine that the respective message includes the positive descriptor.

19. The non-transitory computer-readable storage medium of claim 18, wherein the instructions cause the at least one processor to:
update the machine learning model based on one or more of updates to a common category of entities dictionary of identifiers, one or more updates to a particular sub-category dictionary, one or more indications of a false positive for the set of messages, or one or more indications of a false negative for a message not included in the set of messages.

20. The non-transitory computer-readable storage medium of claim 18, wherein each identifier comprises one of a word, a phrase, or a hashtag indicative of the common category of entities.

21. A non-transitory computer-readable storage medium storing instructions that, when executed, cause at least one processor of a computing system to:
receive, from one or more client devices, messages composed by one or more users of the one or more client devices accessing a social media platform, wherein each of the messages includes a respective identifier, and wherein each respective identifier is associated with a common category of entities;
determine, based on the messages and a machine learning model, an engagement score that represents a level of engagement in a digital domain for a particular sub-category within the common category of entities; and
output, for display at a display device operatively connected to the computing system, a visual representation of the engagement score,
wherein the instructions, when executed, further cause the at least one processor to:
determine, based on a total number of users who subscribe to at least one social media account associated with one of the one or more users of the one or more client devices, a total number of impressions for the messages;
determine a number of impressions for a group of one or more messages in the received messages that include a reference to the particular sub-category; and
determine the engagement score based on the number of impressions for the group of one or more messages that include the reference to the particular sub-category, wherein the engagement score comprises one of:
the number of impressions for the group of one or more messages that include the reference to the particular sub-category, or
a percentage of the impressions for the group of one or more messages that include the reference to the particular sub-category relative to the total number of impressions for the messages.

22. The non-transitory computer-readable storage medium of claim 21, wherein the engagement score is a first engagement score, wherein the particular sub-category is a first particular sub-category, wherein the instructions cause the at least one processor to:
determine, based on the messages, a second engagement score that represents a second level of engagement in the digital domain for a second particular sub-category within the common category of entities,
wherein the visual representation comprises a visual comparison between the first engagement score and the second engagement score.

23. The non-transitory computer-readable storage medium of claim 21, wherein the instructions cause the at least one processor to:
update the machine learning model based on one or more of updates to a common category of entities dictionary of identifiers, one or more updates to a particular sub-category dictionary, one or more indications of a false positive for the set of messages, or one or more indications of a false negative for a message not included in the set of messages.

24. A non-transitory computer-readable storage medium storing instructions that, when executed, cause at least one processor of a computing system to:
receive, from one or more client devices, messages composed by one or more users of the one or more client devices accessing a social media platform, wherein each of the messages includes a respective identifier, and wherein each respective identifier is associated with a common category of entities;
determine, based on the messages and a machine learning model, an engagement score that represents a level of engagement in a digital domain for a particular sub-category within the common category of entities; and
output, for display at a display device operatively connected to the computing system, a visual representation of the engagement score,
wherein the engagement score comprises a first engagement score measured at a first time, and wherein the instructions, when executed, further cause the at least one processor to:
receive, from the one or more client devices, a second set of messages composed by the one or more users of the one or more client devices, wherein each of the messages in the second set of messages includes a respective identifier that is associated with the common category of entities;
determine, at a second time after the first time and based on the second set of messages, a second engagement score that represents a second level of engagement in the digital domain for the particular sub-category within the common category of entities;
determine a difference between the first engagement score and the second engagement score; and
output, for display at the display device operatively connected to the computing system, a visual representation of the difference between the first engagement score and the second engagement score.

25. The non-transitory computer-readable storage medium of claim 24, wherein each identifier comprises one of a word, a phrase, or a hashtag indicative of the common category of entities.

26. The non-transitory computer-readable storage medium of claim 24, wherein the instructions cause the at least one processor to:
determine a number of messages in the received messages that include a positive or a negative descriptor for the particular sub-category; and
determine the first engagement score based on the number of messages that include the positive descriptor or the negative descriptor for the particular sub-category.

27. The non-transitory computer-readable storage medium of claim 24, wherein the first engagement score comprises one of:
the number of messages that include the reference to the particular sub-category, or a percentage of the messages that include the reference to the particular sub-category relative to a total number of received messages.

28. The non-transitory computer-readable storage medium of claim 24, wherein the first engagement score comprises one of:
- the number of impressions for the group of one or more messages that include the reference to the particular sub-category, or
- a percentage of the impressions for the group of one or more messages that include the reference to the particular sub-category relative to the total number of impressions for the messages.

* * * * *